(12) United States Patent
Andersson

(10) Patent No.: US 7,129,450 B2
(45) Date of Patent: Oct. 31, 2006

(54) METHOD AND DEVICE FOR MANUFACTURING PACKAGES

(75) Inventor: Hakan Andersson, Veberod (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/531,372

(22) PCT Filed: Nov. 19, 2003

(86) PCT No.: PCT/SE03/01793

§ 371 (c)(1),
(2), (4) Date: Apr. 15, 2005

(87) PCT Pub. No.: WO2004/054786

PCT Pub. Date: Jul. 1, 2004

(65) Prior Publication Data

US 2006/0049179 A1    Mar. 9, 2006

(30) Foreign Application Priority Data

Dec. 13, 2002  (SE) .................................. 0203694

(51) Int. Cl.
*H05B 6/10* (2006.01)
*B29C 65/36* (2006.01)
*H05B 6/40* (2006.01)

(52) U.S. Cl. ...................... 219/633; 219/634; 219/672; 219/676; 156/69; 156/272.4; 156/380.2; 53/477

(58) Field of Classification Search ........ 219/633–635, 219/672–676; 156/69, 272.4, 274.2, 380.2, 156/379.6; 53/477–479
See application file for complete search history.

(56) References Cited

U.S. PATENT DOCUMENTS

| 3,725,630 | A | * | 4/1973 | Gagliardi .................... 219/633 |
| 4,340,801 | A | * | 7/1982 | Ishibashi et al. ............ 219/633 |
| 5,013,878 | A |   | 5/1991 | Fries, Jr. |
| 5,526,561 | A |   | 6/1996 | McGaffigan |
| 5,889,263 | A |   | 3/1999 | Andersson |
| 6,079,185 | A |   | 6/2000 | Palaniappan et al. |

FOREIGN PATENT DOCUMENTS

| EP | 0426067 A1 | 5/1991 |
| EP | 0480405 A1 | 4/1992 |
| EP | 0642914 A1 | 3/1995 |
| SE | 502829     | 1/1996 |

* cited by examiner

*Primary Examiner*—Philip H. Leung
(74) *Attorney, Agent, or Firm*—Buchanan Ingersoll PC

(57) ABSTRACT

A method and a device for manufacturing packages are provided. The method comprises providing a tubular first package part of a sheet of thermoplastic coated packaging material including at least one layer of an induction heatable material. The first package part has a sealed first joint between two mutually opposing edge sections of the sheet. The method further comprises joining together the first package part and a second package part by a second joint, the first and the second joint intersecting each other. The method further comprises arranging induction heating means including at least two conductors extending along each other, so that the conductors extend along the second joint and sealing the second joint by feeding an inducing current through the induction heating means. The inducing current is conducted by the conductors along the second joint in opposite directions in said at least two conductors.

31 Claims, 18 Drawing Sheets

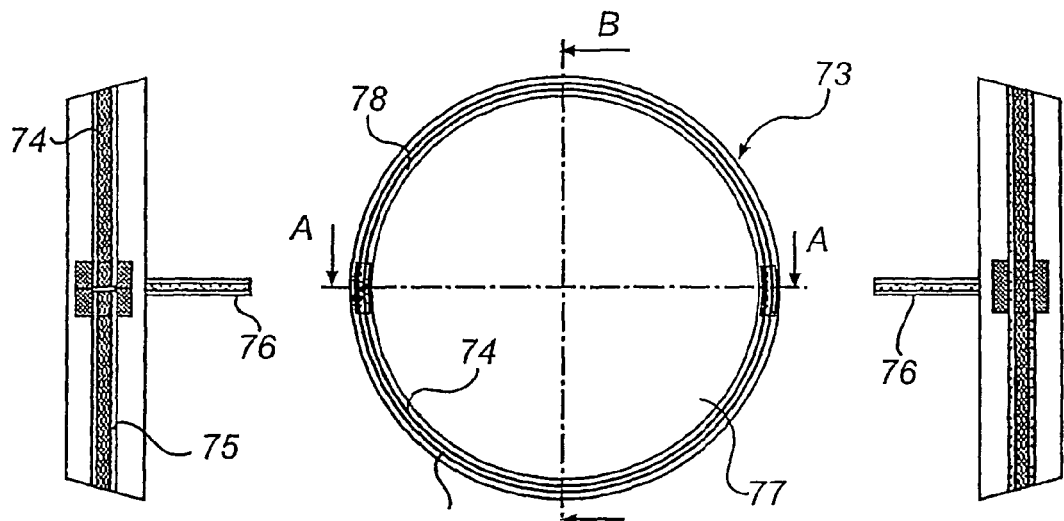
Fig. 14b  Fig. 14a  Fig. 14c
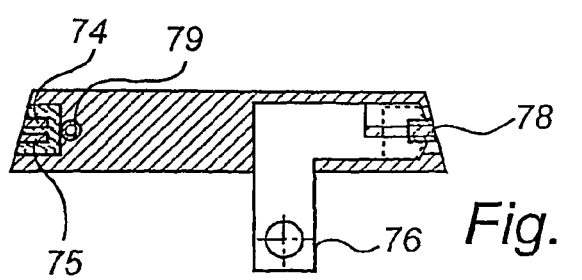
Fig. 14d
Fig. 14e

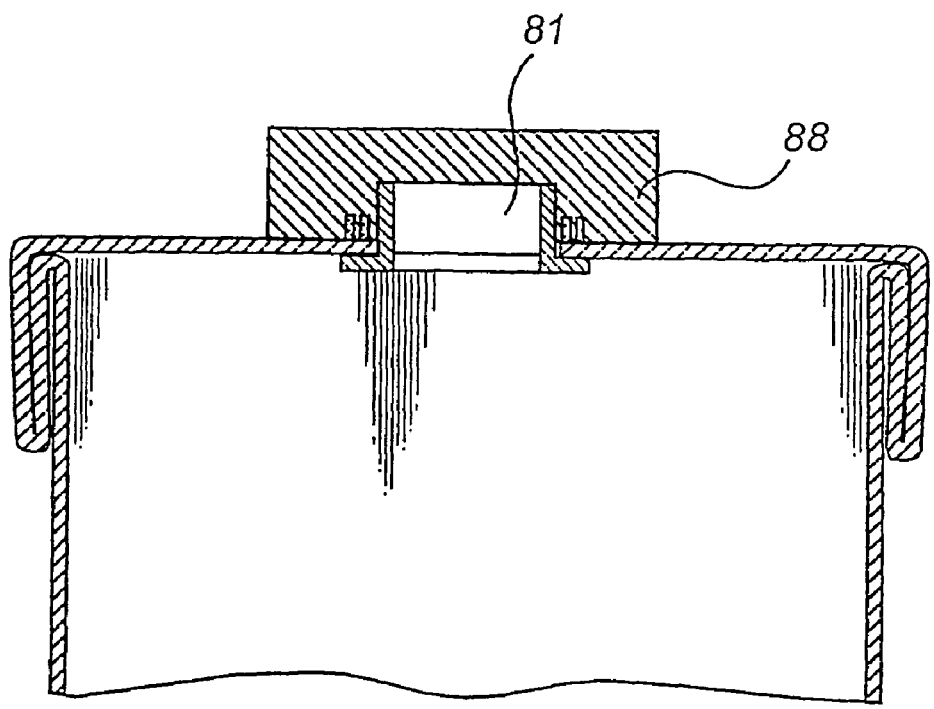
*Fig. 19a*
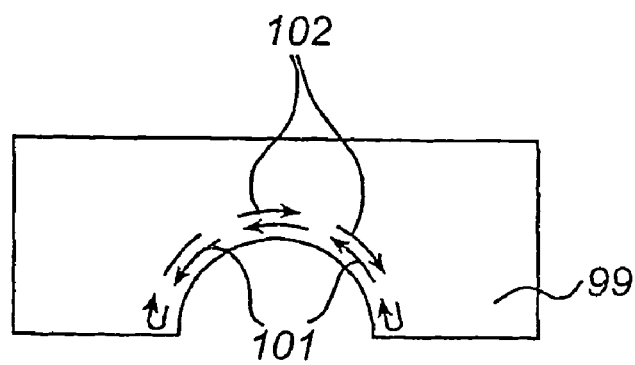
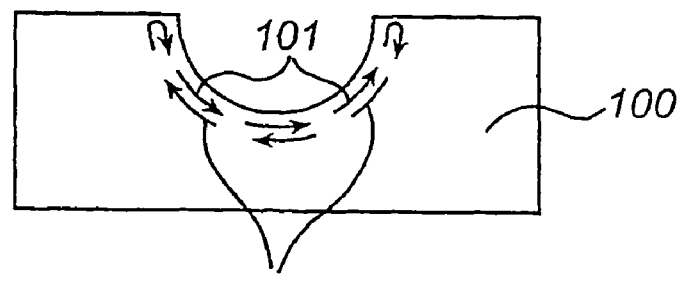
*Fig. 20*

METHOD AND DEVICE FOR MANUFACTURING PACKAGES

TECHNICAL FIELD

The present invention relates to a method for manufacturing packages, comprising providing a tubular first package part of a sheet of thermoplastic coated packaging material including at least one layer of an induction heatable material, the first package part having a sealed first joint between two mutually opposing edge sections of the sheet, and joining together the first package part and a second package part, a second joint being formed between the first and the second package part, the first and the second joint intersecting each other. The present invention also relates to a device for performing the method. Additionally, the present invention relates to a device for manufacturing packages.

BACKGROUND ART

Techniques are known for sealing joints when manufacturing packages. One example of such a known technique is ultrasonic sealing, where ultrasonic energy is applied to a hot-binding medium provided in the joint to seal it. According to another known technique, an adhesive is applied in the joint for sealing. If the joint is of such a kind that it comprises one conductive medium and one hot-binding medium, induction heat sealing can be used to seal the joint.

U.S. Pat. No. 5,889,263 discloses an apparatus for induction sealing of a packaging material comprising an aluminium foil layer. The apparatus comprises an inductor with two parallel conductors interconnected by two transverse conductors. The parallel conductors are disposed in an electrically insulated carrier portion. The transverse conductors are arranged in the upper surface of the inductor and coincide with the outer defining lines of a flat-laid tube of packaging material. The inductor is comprised in a sealing jaw, which is arranged to squeeze a double layer of the packaging material against a counter jaw. The parallel conductors are connected to a current source, whereby an induction current is generated in the aluminium foil layer. Heat is generated, and each of the conductors forms one seal of the packaging material. Between these two seals, the package material may be cut. Thus, by means of this apparatus, one seal of each of two packages can be formed at a time. The apparatus is limited for sealing joints between mutually united and compressed layers of the packaging material, i.e. for transverse sealing of a flat-laid tube of packaging material.

U.S. Pat. No. 6,079,185 discloses an induction sealing device for sealing a closure about an access area of a container. Either the closure or the container comprises a metal medium forming a continuous conductive area around the access area. A conductor is arranged to be provided around the access area, on the outside of the closure and the container. A flowing current in the conductor causes an induced current in the metal medium, which induced current follows the flowing current around the access area. Heat is generated, by means of which the closure is chemically bonded to the container along a joint.

The above mentioned induction sealing device is limited to cases where a continuous conductive area is provided along the entire joint to be sealed. If there should be a discontinuity present in the conductive area, the induced current would be prevented from following the flowing current around the complete access area, and instead would be spread into undesired areas. Such a spreading might cause damaging generation of heat in these undesired areas. Further, the generation of heat in the desired area might be insufficient, a bad sealing of the joint being the result.

SUMMARY OF THE INVENTION

An object of the present inventions is to provide a method and a device for manufacturing packages by means of induction heat sealing, which method and device eliminate the limitations of prior art. The basic concept of the invention is to provide an inducing high frequency current along essentially a complete joint that is to be sealed, which joint comprises an induction heatable material, the inducing current being provided in two opposite, essentially parallel, directions extending along each other. The invention thus enables an induced heating current to be "guided" along essentially the complete joint even if there is a discontinuity in a conductive area along the joint, the conductive area being defined by the induction heatable material in the joint. Spreading of the induced heating current is prevented, a tight and strong sealing of the complete joint being accomplished.

The method and the device for achieving the object above are defined in the appended claims and discussed below.

A method for manufacturing packages according to the present invention comprises the steps of providing a tubular first package part of a sheet of thermoplastic coated packaging material including at least one layer of an induction heatable material, the first package part having a sealed first joint between two mutually opposing edge sections of the sheet, and joining together the first package part and a second package part, a second joint being formed between the first and the second package part, the first and the second joint intersecting each other. The method is characterized in further comprising the steps of arranging induction heating means including at least two conductors extending along each other, so that the conductors extend along the second joint, and sealing the second joint by feeding an inducing current through the induction heating means, the inducing current being conducted by the conductors along the second joint in opposite directions in said at least two conductors.

According to one embodiment, joining together the first and the second package part comprises positioning the first and second package parts so that the second package part protrudes from an open end of the tubular first package part, and arranging the induction heating means comprises providing the conductors circumferentially along the first package part. This embodiment is particularly advantageous when sealing a second joint between two package parts having essentially similar outer contours at the second joint.

According to an alternative embodiment, joining together the first and the second package part comprises positioning the first and second package parts so that the second package part protrudes from an opening in a wall portion of the first package part, and arranging the induction heating means comprises providing the conductors circumferentially around the opening. This embodiment is particularly advantageous when sealing a second joint between two package parts not having similar outer contours at the second joint.

A device for manufacturing packages according to the present invention comprises means for providing a tubular first package part of a sheet of thermoplastic coated packaging material including at least one layer of an induction heatable material, the first package part having a sealed first joint between two mutually opposing edge sections of the sheet, means for joining together the first package part and a second package part, a second joint being formed between the first and the second package part, the first and the second joint intersecting each other, and current supply means for feeding an inducing current. The device is characterised in further comprising induction heating means for sealing the second joint, the induction heating means being connected to the current supply means and including at least two conductors extending along each other, which are arranged to extend along the second joint and conduct the inducing current along the second joint in opposite directions in said at least two conductors.

According to one embodiment, the conductors are arranged to be provided on the outside of the first package part.

With the above mentioned arrangement, the induction heating means may be formed with a hole or recess for receiving portions of the first and second package parts forming the second joint, the conductors being arranged along a wall enclosing the hole or recess. This hole or recess enables easy positioning of the conductors in the correct sealing position in relation to the second joint. The expression "the correct sealing position" corresponds to the conductors being arranged as close to the second joint as possible. In this position, the second joint will be surrounded by the wall enclosing the hole or recess.

Preferably, a circumference of the hole or recess is essentially equal to an outer circumference of the package parts along the second joint, the wall enclosing the hole or recess exerting a compressive load on the second joint during the sealing of the same. Such a compressive load applied on the second joint improves the strength and tightness of the sealing.

Advantageously, the hole or recess is frusto conical for receiving said second package part being tapered in a direction from the second joint, a smallest circumference of the hole or recess being smaller than an outer circumference of the package parts along the second joint, the wall enclosing the hole or recess exerting a compressive load on the second joint during the sealing of the same. With this configuration, a pressure can be applied on the induction heating means, and a counter pressure on the unsealed package, in directions being parallel to a centre axis of the hole or recess, for achieving the compressive load on the second joint.

In the embodiment where the conductors are arranged to be provided on the outside of the first package part, the induction heating means may alternatively be formed with a recess or hole for receiving at least a portion of the second package part, the conductors being arranged in one and the same plane, one of them enclosing another, and surrounding the recess or hole. Just like in the alternative mentioned above, this recess or hole enables easy positioning of the conductors in the correct sealing position in relation to the second joint. As before, the expression "the correct sealing position" corresponds to the conductors being arranged as close to the second joint as possible. In this position, the plane in which the conductors are arranged will be parallel to a surface of the first package part along the second joint.

According to an alternative embodiment, the conductors are arranged to be provided on the inside of the first package part.

With the above mentioned arrangement, the induction heating means may include a support element arranged to be surrounded by portions of the first and second package parts forming the second joint, the conductors being arranged along a wall on, and enclosing, the support element, the wall exerting a compressive load on the second joint during the sealing of the same. This support element enables easy positioning of the conductors in the correct sealing position in relation to the second joint. As before, the expression "the correct sealing position" corresponds to the conductors being arranged as close to the second joint as possible. In this position, the second joint will surround the wall of the support element.

Preferably, each of the conductors forms a circumferential and incomplete current path along the second joint. The distance between the ends of the current paths is advantageously as small as possible to "guide" the induced heating current along as much of the joint as possible. However, the distance is preferably large enough to avoid flash-over between the ends.

According to a preferred embodiment, the conductors are connected to each other at one end and to the current supply means at another end. This arrangement will allow for two conductors to conduct the inducing current in the two opposite directions along the second joint without having to use more than two electrical connections.

Advantageously, the induction heating means is arranged to induce a heating current in said layer of the induction heatable material, the layer comprising a metal foil. Preferably, the metal foil may be composed of aluminium, which presents good-conductivity and additionally is suitable as oxygen-barrier material in antiseptic packages.

The characteristics discussed in connection with the device are, of course, transferable to the method according to the present invention. Additionally, the characteristics described are transferable to a device for manufacturing packages comprising induction heating means including at least two conductors extending along each other and being arranged to be connected to a current supply means. Such a device is characterized in that the conductors are arranged to conduct an inducing current in opposite directions.

Naturally, the above discussed characteristics may be combined in the same embodiment.

BRIEF DESCRIPTION OF THE DRAWINGS

FIG. 5b shows two package parts, which can be sealed together by means of the induction sealing device in FIG. 5a.

FIGS. 14a–e illustrate an alternative embodiment of the induction heating means according to the present invention.

FIGS. 19a–b illustrate an arrangement for sealing a joint of the package in FIGS. 16a–b by means of the induction heating means in FIGS. 17a–d.

FIG. 20 illustrates induced current paths in the package in FIGS. 16a–b caused by the induction heating means in FIGS. 17a–d.

DETAILED DESCRIPTION OF EMBODIMENTS

Figure 1:
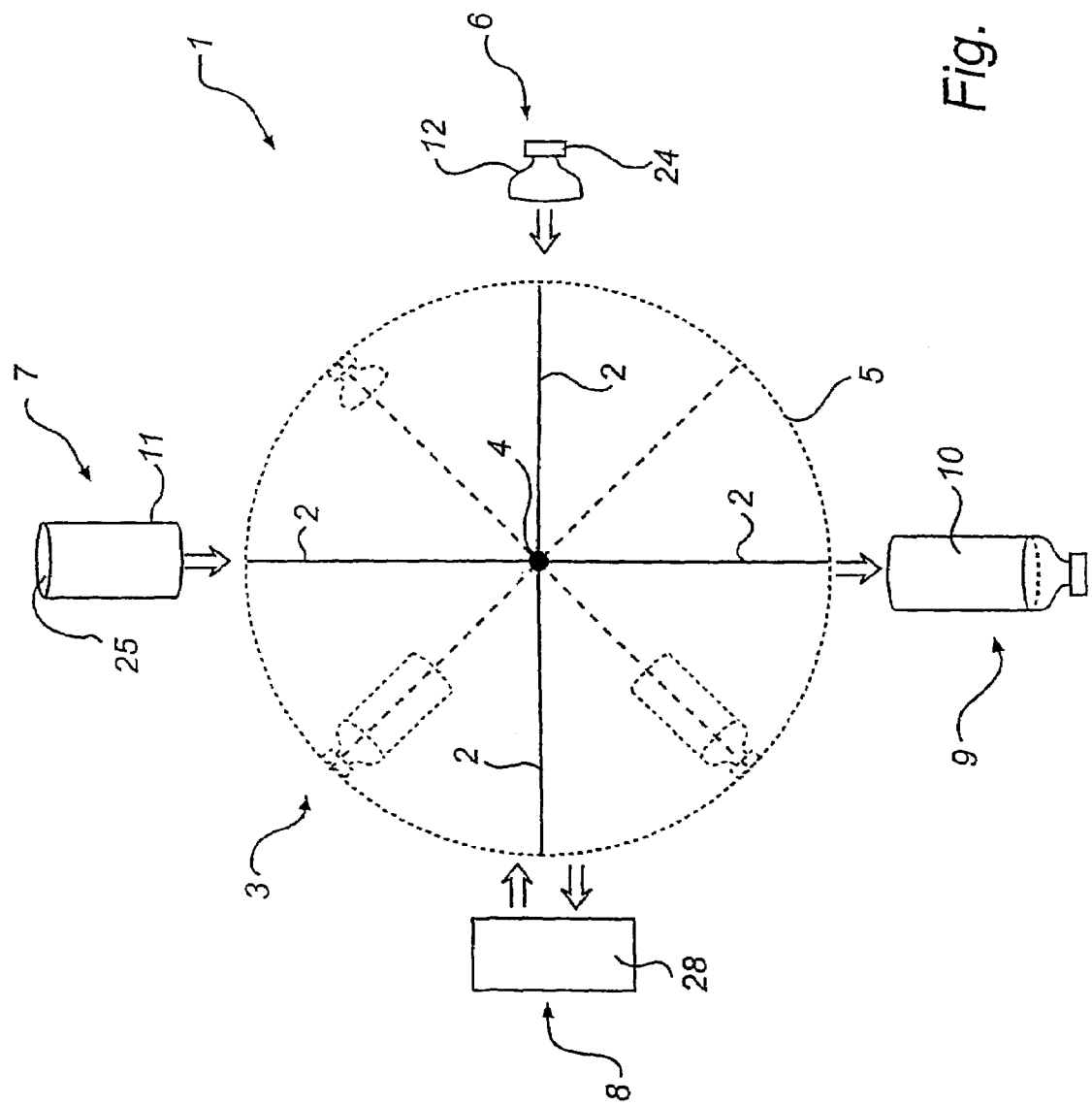
FIG. 1 shows a device for manufacturing packages according to the present invention.

FIG. 1 is a schematic plan view of a device 1 for manufacturing packages. The device 1 has a number of arms 2 attached to a wheel 3. During operation the wheel 3 is rotating around a geometrical axis 4, whereby the arms 2 are moving in a circular path 5. Along the circular path 5 is a number of processing stations 6–9, where certain steps of the manufacturing procedure are performed. Below, the processing stations will be described in further detail.

Figure 2:
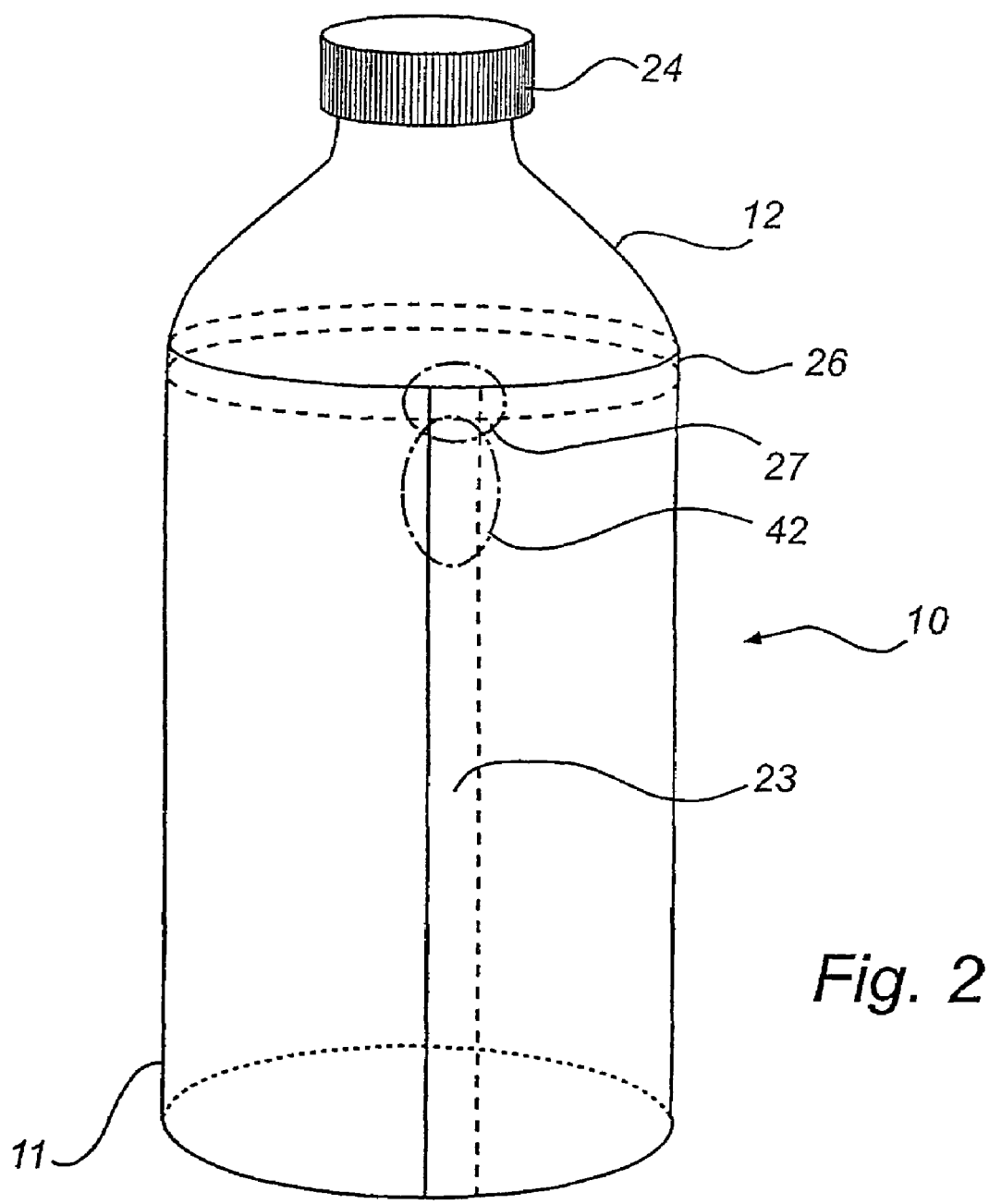
FIG. 2 shows a package, which can be manufactured by means of the device in FIG. 1.
Figure 3:
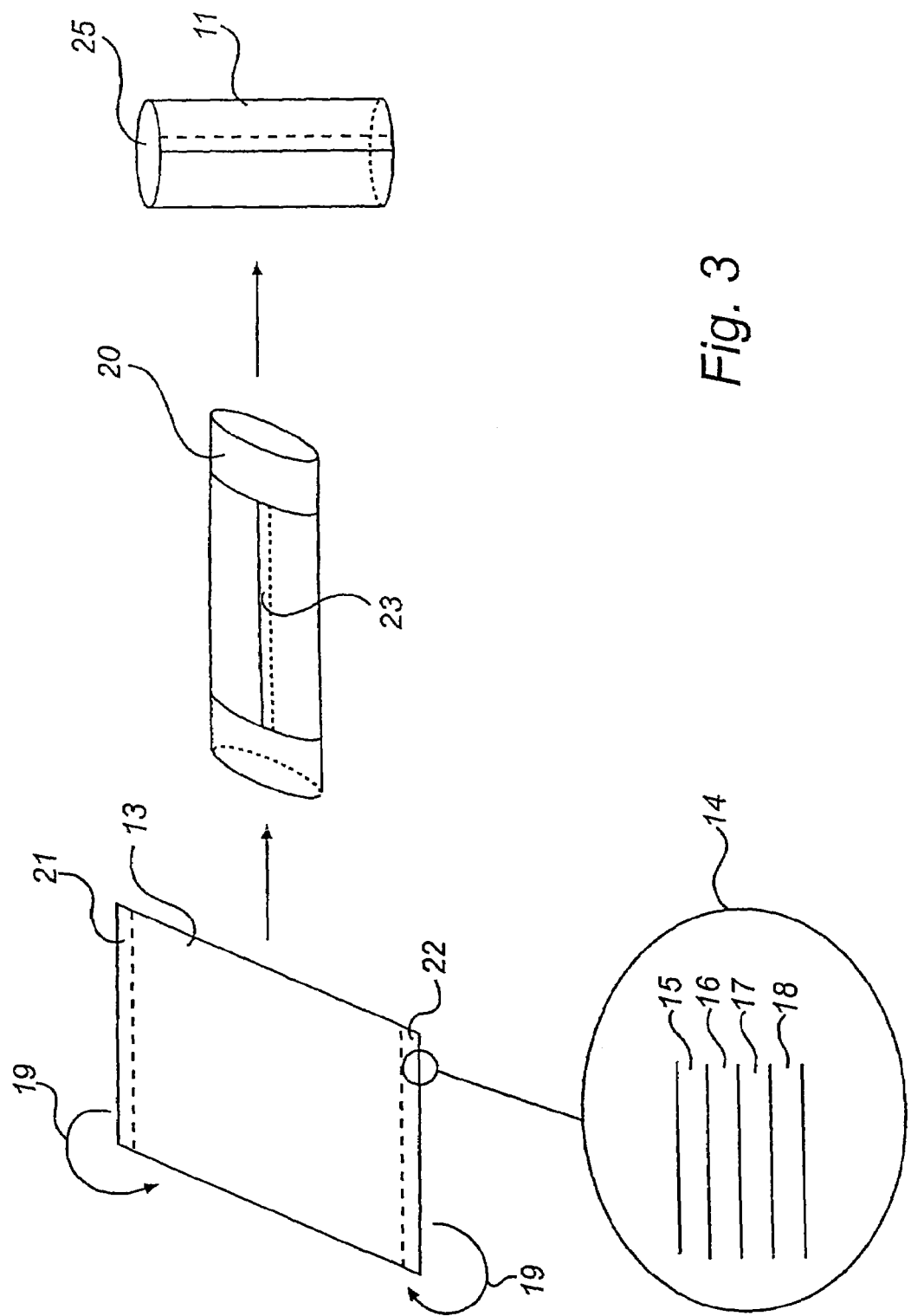
FIG. 3 illustrates a method for producing one part of the package in FIG. 2.

FIG. 2 shows an example of a package 10 that can be manufactured by means of the device 1. The package has the shape of a bottle consisting of a first package part 11 and a second package part 12. The first package part 11 is tubular and made of a thermoplastic coated packaging material. FIG. 3 schematically illustrates the production of such a first tubular package part or sleeve 11. A sheet 13 of packaging material is used to produce one sleeve 11. The encirclement 14 contains an enlargement showing a cross-section through the sheet 13. The sheet 13 consists of a thermoplastic layer 15, a layer of an induction heatable material in the form of an aluminium foil 16, a layer of carton 17 and another thermoplastic layer 18. The thermoplastic layers may consist of, for example, polypropene, polyethylene or polyethylene terephthalate ("PET"). The sheet 13 is, as indicated by the arrows 19, folded around a forming means 20 and formed into a tube by arranging two opposing edge sections 21, 22 of the sheet with a mutual overlap. By means of a sealing means (not shown), the thermoplastic in the overlapping area is heated, whereby a sealed first joint 23 is formed. The second package part 12, which for example can be produced by blow moulding or injection moulding, is a plastic top provided with an opening/closing arrangement 24.

Figure 4:
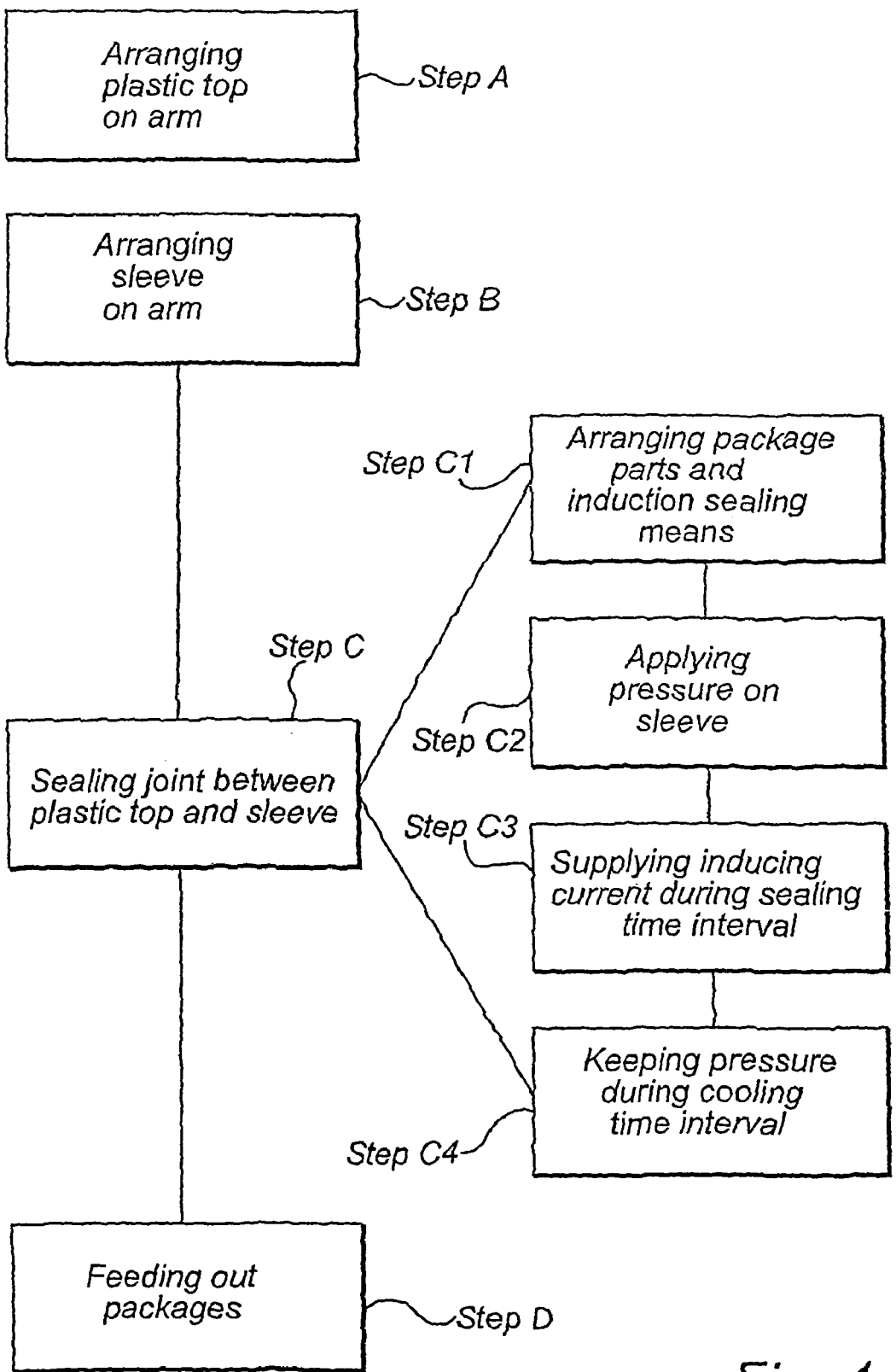
FIG. 4 shows a flowchart illustrating a method for manufacturing packages according to the present invention.

FIG. 4 contains a flow chart illustrating a method for manufacturing the package 10 in FIG. 2 by means of the device 1 in FIG. 1.

As mentioned above, the wheel 3 and the arms 2 are rotating during operation, whereby each arm 2 on the wheel 3 is guided to the different processing stations 6–9 along the circular path 5. When the wheel 3 has rotated 360 degrees, each arm 2 on the wheel 3 will have passed each processing station once. The rotation is performed stepwise, and every step corresponds to a movement of an arm 2 between two processing stations. Between two steps, i.e. at every processing station, the wheel 3 stops for a certain time interval to allow for the different steps of the manufacturing procedure to be performed. During operation, each of the arms 2 is used for manufacturing one package 10 per revolution of the wheel 3. In FIG. 1, the sketches made with ghost lines illustrate the result after each processing station.

At the first processing station 6, one plastic top 12 is arranged on each arm 2 (step A). The plastic tops can be transported to the first processing station by means of a conveyor (not shown), and the plastic tops can be brought from the conveyor and put on each arm by means of a pick and place apparatus (not shown). At the second processing station 7, one sleeve 11 is arranged on each arm 2 and slipped over the plastic top (step B). The sleeves are provided from the sealing means discussed above after production in accordance with FIG. 3. Also the sleeves 11 can be brought from the sealing means and put on each arm by means of a pick and place apparatus (not shown). After this step, the sleeve 11 and the plastic top 12 are joined together. The plastic top protrudes from and open end 25 of the tubular sleeve 11 (FIG. 3), the sleeve partially overlapping the plastic top at a second joint 26 between the two. Thereby, the first and the second joint, 23 and 26, will intersect each other in an area enclosed by the encirclement 27 in FIG. 2. At the third processing station 8, the second joint 26 between the sleeve 11 and the plastic top 12 is sealed (step C), by means of a sealing apparatus 28 (symbolically illustrated). The sealing apparatus 28, and step C in the method, will be described more in detail below. After this step the sleeve 11 and the plastic top 12 are fastened together at the second joint 26. At the fourth and last processing station 9, the packages 10 are fed out and away from the device 1 (step D). Also this step can be performed by means of a pick and place apparatus and a conveyor (not shown).

For sealing the second joint 26, and preferably also the first joint 23, induction heat sealing is used. The principles behind this sealing technique, as applied in the present invention, is to induce an electrical heating current in the aluminium foil 16 to heat the foil, and thus also the thermoplastic layer 15. The heating current in the aluminium foil may be induced by a magnetic field created by an electrical high frequency inducing current flowing through an electrical conducting material in an induction sealing device nearby.

Figure 5A:
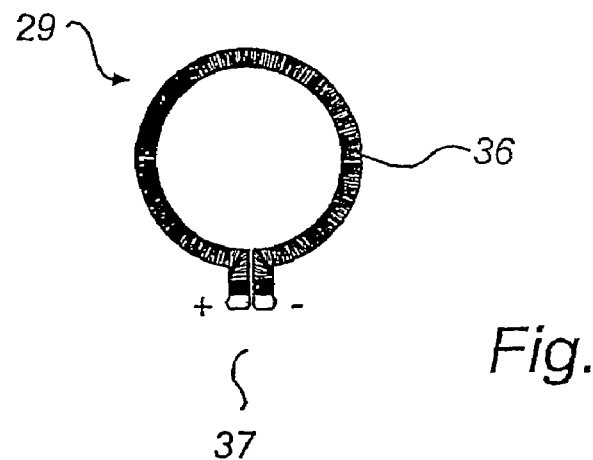
FIG. 5a schematically illustrates a part of a known induction sealing device.
Figure 5B:
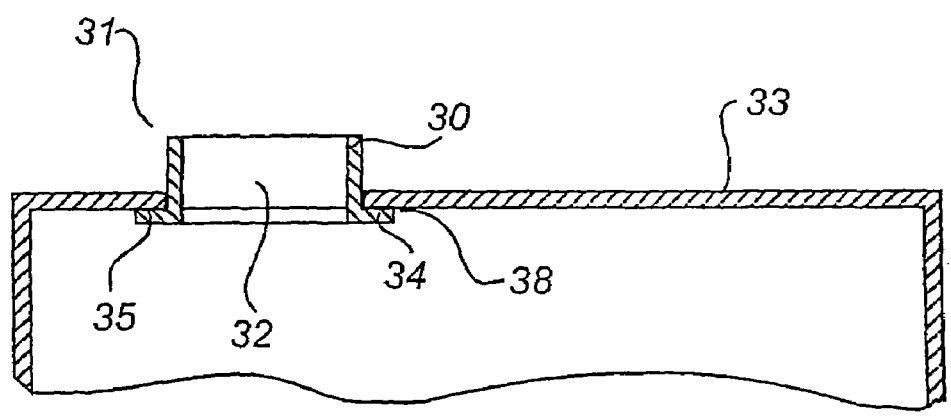
Figure 5C:
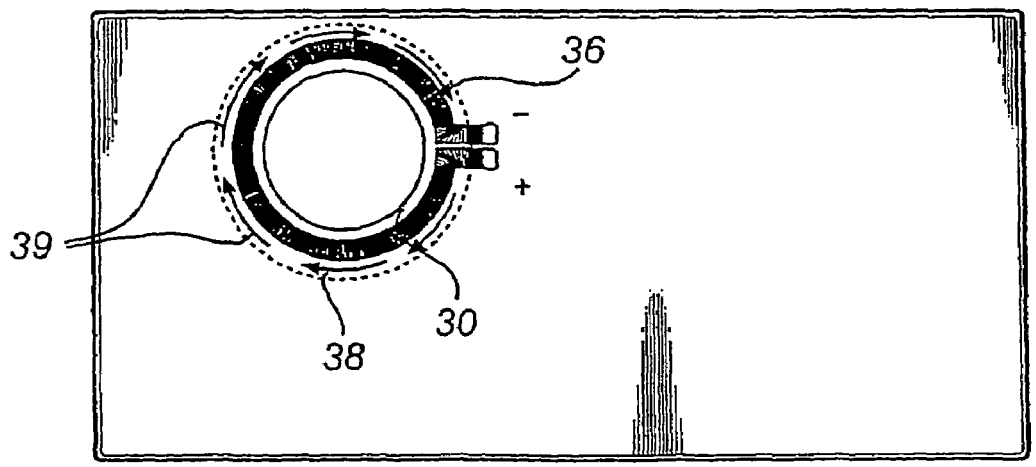
FIG. 5c illustrates the sealing of the package parts in FIG. 5b.

FIG. 5a is a schematic view of a part 29 of a known induction sealing device (not shown as a whole). It is used for induction heat sealing of a closure, composed of a spout and a flange of a thermoplastic material, to a container, composed of a thermoplastic coated material including a metal layer. As illustrated in section in FIG. 5b, the spout 30 of the closure 31 is arranged to protrude from an opening 32 in the container 33. Further, the flange 34 is arranged to abut against an area 35 around the opening 32 inside the container. The induction sealing device comprises a conductor 36 connected to a current supply means 37 (indicated by + and −). The conductor 36 is arranged to be placed around the spout 30 along a joint 38 between the closure 31 and the container 33, as illustrated in the top plan view in FIG. 5c. When a current is flowing through the conductor 36, a magnetic field is created around the conductor. A current is induced in the metal layer, the conductor 36 "guiding" the induced current along the joint 38. The thermoplastic material in the joint is heated, whereby the joint is sealed and the container and closure, or, more particularly, flange of the closure, are fasten together. In an arrangement of this kind, the metal layer forms a continuous conducting area along the complete joint 38, the magnetic field created inducing a current being conducted along essentially the complete joint, as illustrated by means of arrows 39 in FIG. 5c.

Figure 6:
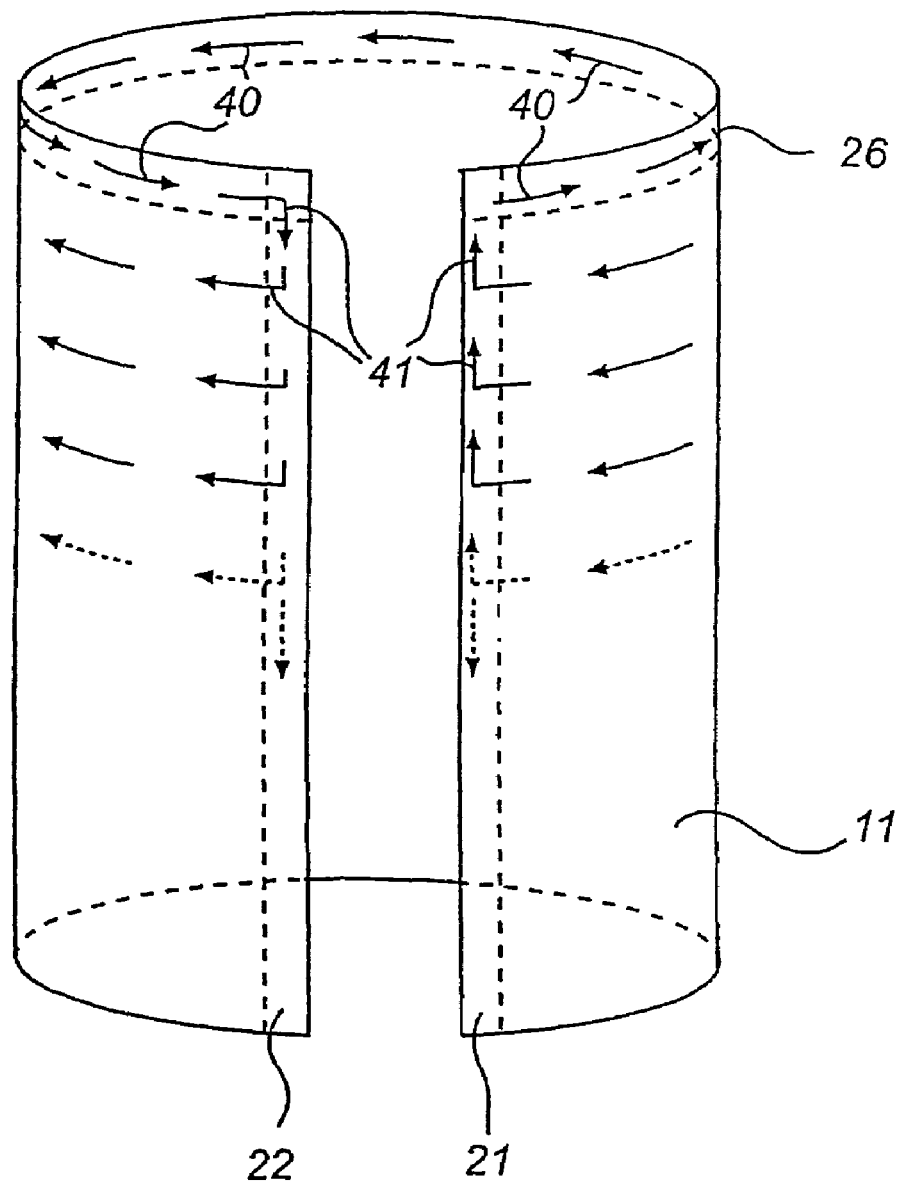
FIG. 6 illustrates induced current paths in the package in FIG. 2 caused by the known induction sealing device.

FIG. 6 illustrates the sealing result when the known induction sealing device described above is used to seal the second joint 26 of the package 10 in FIG. 2. For the sake of clarity, only the sleeve 11 is shown in FIG. 6. Further, the first joint 23 of the sleeve is shown "unsealed". The reason for this is to allow for a clear illustration of the induced heating current path in the aluminium foil 16. In this arrangement, because of the first joint of the sleeve, the aluminium foil does not form a continuous conducting area along the complete second joint 26. There is a break in the aluminium foil in the overlap between the edge sections 21 and 22 of the sheet 13. When an inducing current is supplied in the known induction sealing device, the magnetic field created around the conductor 36 will induce a heating current in the aluminium foil, which is "guided" by the conductor along the second joint in a direction indicated by arrows 40. When the induced current reaches the break of the aluminium foil, it can no longer be "guided" in the direction 40 defined by the conductor, i.e. along the second joint, but is forced to go in another direction. Therefore, as a consequence of the laws of the nature, the induced current will instead be conducted along the path corresponding to the lowest impedance. Since the first joint 23 of the sleeve 11 corresponds to the lowest impedance, the induced current will follow the first joint some distance before gradually leaking out. After leaking out, the induced current will "turn back" along directions being approximately opposite to the direction 40 until reaching the first joint again, follow the first joint until reaching the second joint 26, and continue to follow the direction 40. The above described current path is illustrated by means of arrows 41 in FIG. 6. Thus, the consequence of the break in the conducting area along the second joint, together with the known induction sealing device, is that the current induced will leak from the second joint into undesired parts of the sleeve.

Because of the induced current leaving the desired sealing area, and instead following the first joint 23, the aluminium foil along the first joint will be heated, and thus also the thermoplastic layers along the first joint. This may weaken or even damage a part of the first joint where the leaking induced current is sufficiently strong to affect the sealing of the first joint. This part of the first joint is indicated by an encirclement 42 in FIG. 2. One possible way to overcome this deficiency would be to apply a pressure over the first joint to prevent the edge sections 21 and 22 from parting, and thus the sealing from being weakened or damaged. However, there is another drawback introduced by the induced current leaving the desired sealing area. Since much of the power provided by the induced current is dissipated outside the desired sealing area, the power dissipated in the area enclosed by the encirclement 27 in FIG. 2 may be insufficient. This may result in a weak, leaking sealing of the second joint in this area. To overcome this drawback, the power provided by the induced current will have to be increased. However, an increased sealing power may in turn give rise to negative results on the sealing of the parts of the second joint not enclosed by the encirclement 27 in FIG. 2. Additionally, such an increased sealing power will require an increased energy supply to the induction sealing device.

Figure 7A:
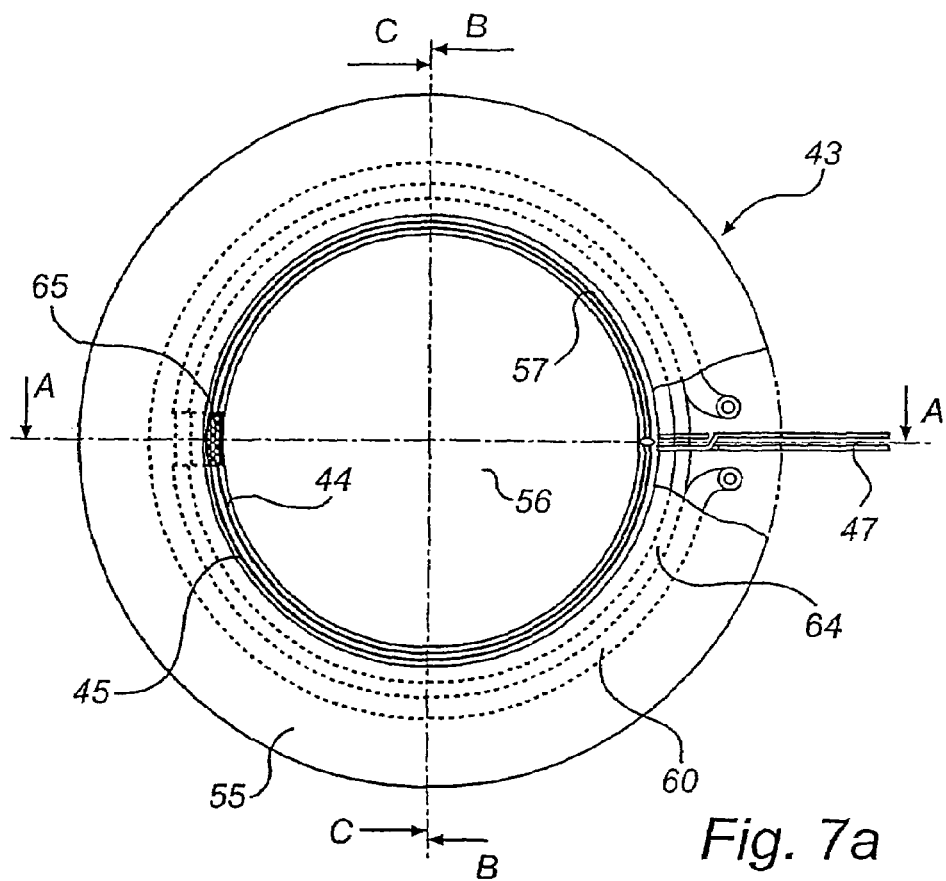
FIGS. 7a–d illustrate an induction heating means according to the present invention.
Figure 7B:
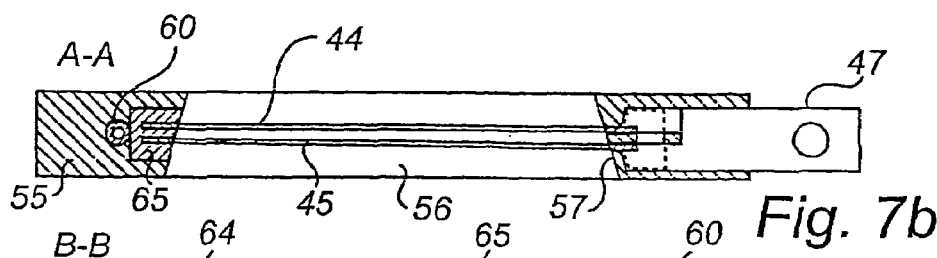
Figure 7C:
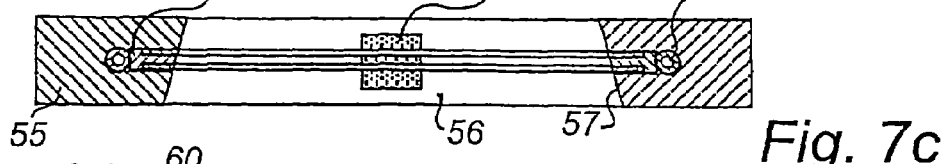
Figure 7D:
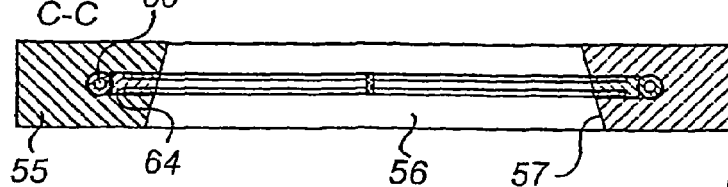
Figure 8A:
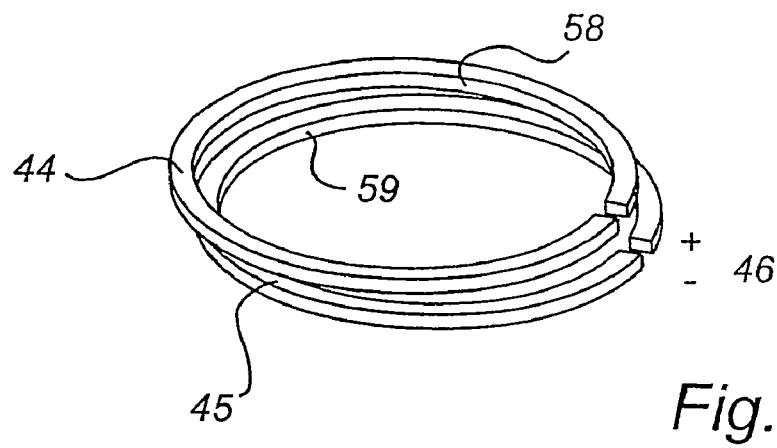
FIGS. 8a–c illustrate isolated parts of the induction heating means in FIGS. 7a–d.
Figure 8B:
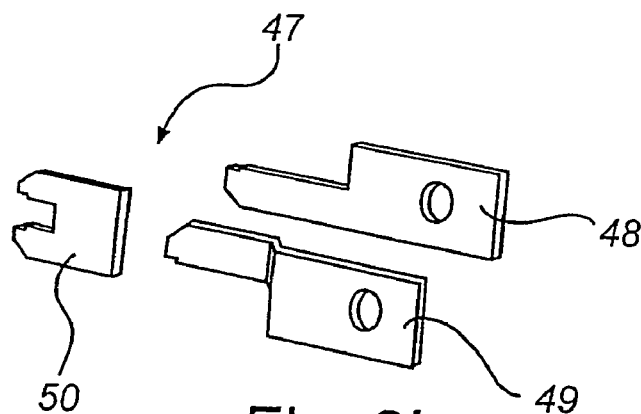
Figure 8C:
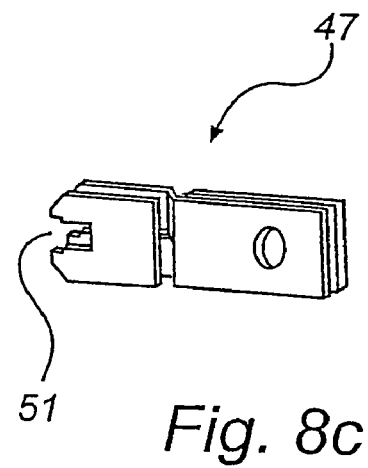
Figure 8D:
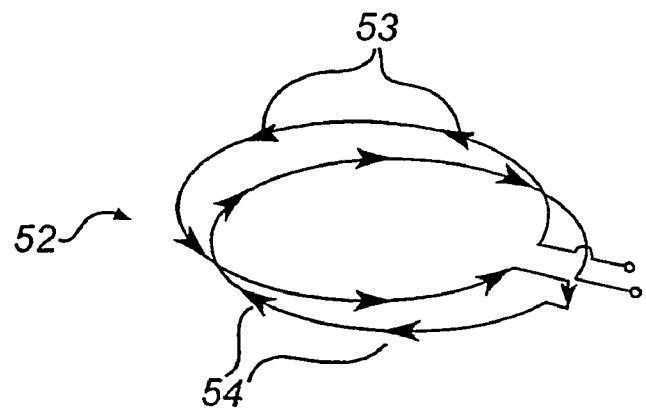
FIG. 8d illustrates a circuit diagram corresponding to the induction heating means in FIGS. 7a–d.

FIG. 7a is a schematic top plan view of an induction heating means 43 according to the present invention. The induction heating means is comprised in the sealing apparatus 28 in FIG. 1. FIGS. 7b–d are cross-sectional views of the induction heating means 43, taken along the lines A—A, B—B and C—C, respectively, in FIG. 7a. The induction heating means comprises two circular copper conductors 44 and 45, which have the same form and essentially similar dimensions. The conductors are arranged, electrically insulated from each other, in parallel planes and extend along each other. In FIG. 8a, the conductors 44 and 45 are shown "naked" and isolated from the rest of the induction heating means 43, below also referred to as the inductor means. The conductors are arranged to be connected to a 500 kHz high frequency current supply means 46 (indicated by + and −), also comprised within the sealing apparatus 28 in FIG. 1. For this purpose, the inductor means 43 further comprises an electrical connection element 47, which is shown "naked" and isolated from the rest of the induction means in FIGS. 8b and 8c. FIG. 8b is an exploded view of the electrical connection element. It comprises a plus pole connector 48, arranged to be connected to a plus pole of the current supply means, and a minus pole connector 49, arranged to be connected to a minus pole of the current supply means. The electrical connection element 47 further comprises a conductor connector 50, arranged to interconnect the conductors 44 and 45. FIG. 8c is an assembly view of the element parts in FIG. 8b. Naturally, when assembled, the element parts are electrically insulated from each other by means a suitable insulator (not shown). The recess 51 in the electrical connection means is arranged to receive the conductors 44 and 45 to achieve electrical connections between the conductors and the element parts 48, 49 and 50. FIG. 8d contains a principal "circuit diagram" 52 that illustrates these electrical connections. As is apparent from FIG. 8c together with FIG. 8d, a current applied to the plus and minus pole connectors 48 and 49 will be conducted in one direction in the conductor 44, as indicated by arrows 53, and in a parallel opposite direction in the conductor 45, as indicated by arrows 54.

Referring again to FIGS. 7a–7d, the induction heating means 43 further comprises an insulating body 55 in which the conductors 44 and 45, and the electrical connection element 47, partially are arranged. The body is formed with a frusto conical hole 56, the body thus having the shape of a hollow cylinder. As is apparent from the figures, the conductors are arranged along a wall 57 enclosing the frusto conical hole, almost entirely embedded within the body 55. Only the "inner walls" 58 and 59 (FIG. 8a) of the conductors 44 and 45, respectively, can be seen from the outside of the induction heating means 43. Additionally, the induction heating means 43 comprises a cooling element for cooling. The cooling element comprises a copper tubing 60 which is embedded in the insulating body 55 and extends along the conductors 44 and 45. The copper tubing is arranged to guide a cooling medium, for example water, along the conductors to cool them.

Figure 9A:
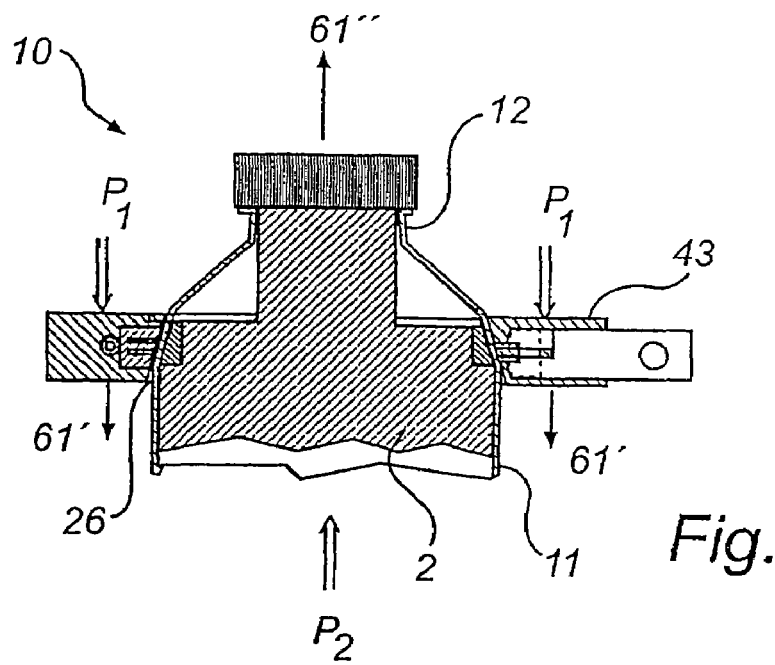
FIGS. 9a–b illustrate an arrangement for sealing a joint of the package in FIG. 2 by means of the induction heating means in FIGS. 7a–d.
Figure 9B:
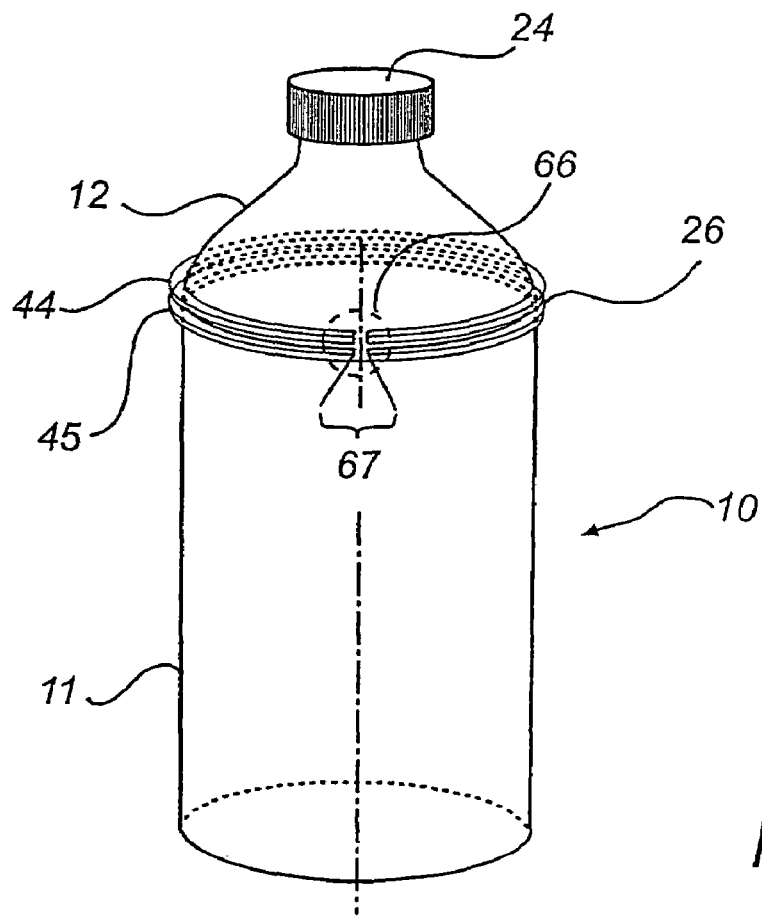

FIG. 9a is a cross-sectional view of the arrangement for sealing the second joint 26 of the package 10 by means of the induction heating means 43. FIG. 9b is a perspective view of the arrangement in FIG. 8a, the induction heating means 43, however, being illustrated without the insulating body 55, the electrical connection element 47 and the copper tubing 60. As is apparent from FIGS. 9a and 9b, the inductor means 43 is arranged on the outside around the second joint 26 during sealing. For achieving this arrangement, the induction heating means 43 is slipped on to the plastic top 12 of the package 10, as indicated by the arrows 61', the package being arranged on one of the arms 2. This is equivalent with the plastic top being inserted into the frusto conical hole 56, as indicated by the arrow 61". Since the plastic top is tapered in the direction 61" from the second joint 26, the unsealed package will move freely through the induction means a certain distance before "getting caught" by the wall 57 enclosing the frusto conical hole 56. The smallest circumference of the frusto conical hole is slightly smaller than the outer circumference of the package parts 11 and 12 along the second joint 26. Further, the inner circumference of the conductors 44, 45 is essentially equal to the outer circumference of the package parts along the second joint. The above implies that the package will "get caught" in the induction means in such a way that the second joint will be surrounded by the conductors, i.e. the conductors will follow the second joint around the package.

Referring again to FIG. 4, the second joint 26 between the sleeve 11 and the plastic top 12 is sealed in step C in the flow chart. The sealing step C is composed of several sub steps, which will be described hereinafter. In the first sub step C1, the package parts and the induction heating means 43 are arranged as described above, i.e. the conductors 44 and 45 are arranged around the second joint. In the next sub step, C2, a pressure $P_1$ is applied on the induction heating means, and a counter pressure $P_2$ from the arm 2 on the unsealed package 10, wherein the pressures are applied in directions being parallel to the first joint 23 of the sleeve, as is illustrated in FIG. 9a. The pressures will cause the wall 57 enclosing the frusto conical hole 56 to exert a compressive load on the second joint 26. In the next sub step, C3, an inducing current is supplied to the induction heating means 43, and conducted by the conductors 44, 45 around the second joint. The inducing current is supplied during a certain sealing time interval of 150 ms–1s, during which a heating current is induced in the aluminium foil 16, which is heated, whereby also the thermoplastic layer 15 is heated. At the end of the sealing time interval, the second joint will be sealed, the thermoplastic layer, however, still being warm. Thus, if the pressure $P_1$ on the induction heating means 43 is released immediately after the sealing time interval, the sealing of the second joint may not be sufficiently strong, and may be damaged. Therefore, step C further comprises the sub step C4, wherein the pressure on the induction heating means is kept for a cooling time interval of 150 ms–1 s before being released. The cooling time interval allows for the thermoplastic layer to cool off sufficiently to achieve a strong and tight sealing of the second joint.

Figure 10:
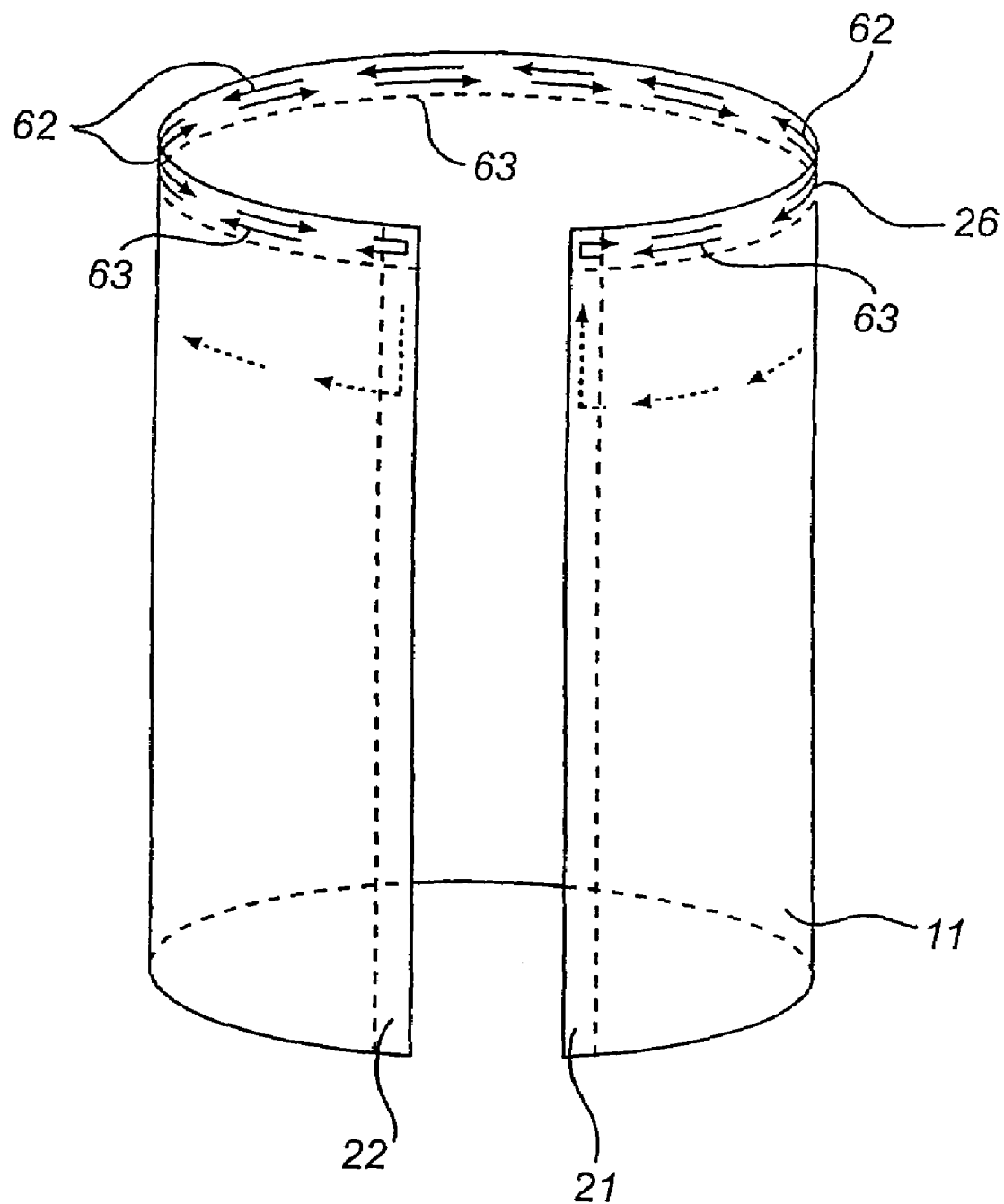
FIG. 10 illustrates induced current paths in the package in FIG. 2 caused by the induction heating means in FIGS. 7a–d.
Figure 11A:
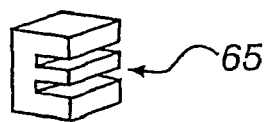
FIGS. 11a–c show different embodiments of an insert for concentrating magnetic fields, which can be used in connection with the induction heating means according to the present invention.
Figure 11B:
Figure 11C:
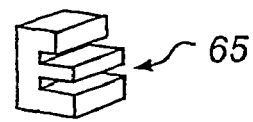

FIG. 10 illustrates the sealing result when the induction heating means 43 is used to seal the second joint 26 of the package 10 in FIG. 2. Just like in FIG. 6, for the sake of clarity, only the sleeve 11, with the first joint 23 "unsealed", is shown in FIG. 10. In this way, the path of the induced heating current can be illustrated clearly. Also in this arrangement, the aluminium foil 16 does not form a continuous conducting area along the complete second joint because of the break in the overlap between the edge sections 21 and 22 of the sheet 13. When an inducing current is supplied in the inductor means 43, the magnetic field created around the conductor 44 will induce a first heating current in the aluminium foil, which is "guided" by the conductor 44 along the second joint in the direction indicated by arrows 62. In a similar way, the magnetic field created around the conductor 45 will induce a second heating current in the aluminium foil, which is "guided" by the conductor 45 along the second joint in the direction indicated by arrows 63. Thus, the first and second induced heating currents will follow the second joint 26 in two parallel opposite directions, 62 and 63. When the first heating current in the direction indicated by the arrows 62 reaches the break of the aluminium foil, it can no longer be "guided" in the direction 62 defined by the conductor 44, but is forced to go in another direction. Then, the first heating current "turns back" and, "guided" by the conductor 45, instead starts following the direction 63. Though, a small amount of the first heating current will still leak into, follow, and leak out of the first joint. However, this amount is so small that it will have an insignificant effect on the sealing of the first joint. The corresponding phenomenon appears when the second heating current in the direction indicated by the arrows 63 reaches the break of the aluminium foil, i.e. it "turns back" and instead starts following the direction 62. Thus, because of the inductor means conducting the inducing current in two parallel opposite directions around the second joint, only a very small amount of the current induced in the aluminium foil will leak from the second joint into undesired parts of the sleeve.

As is apparent from the above description, the second joint is actually constituted of two sub joints, one sub joint made by the first heating current and a second sub joint made by the second heating current. The two sub joints are preferably closely arranged, the distance between the conductors 44 and 45 thus being small (approximately 1–2 mm). Because of this small distance between the conductors, their respective magnetic fields tend to interfere with each other, the sealing result being affected negatively. To avoid this negative effect, a highly magnetic permeable material, such as Ferrotron™, can be arranged between the conductors 44 and 45. In FIGS. 7a, c and d, a Ferrotron™-insert 64 can be seen arranged between the conductors 44 and 45. The function of the Ferrotron™-insert is to concentrate the magnetic fields around the respective conductors. This concentration results in the magnetic fields being separated and thereby prevented from interfering with each other.

As illustrated in FIG. 10, when using the induction heating means 43 according to FIGS. 7a–d, most of the induced current will remain in the desired sealing area. Therefore, the aluminium foil along the first joint 23 will not be heated sufficiently to affect the sealing of the first joint in the area enclosed by the encirclement 42 in FIG. 2. Further, since most of the power provided by the induced current therefore is dissipated inside the desired sealing area, the power dissipated in the area enclosed by the encirclement 27 in FIG. 2 will be sufficient to obtain a good, tight sealing of the second joint in this area without having to increase the energy supply to the induction heating means 43.

Nevertheless, the area enclosed by the encirclement 27 in FIG. 2 is a critical part of the package 10, and a leakage in the package is most likely to occur here. Therefore, it is desirable to further increase the strength of the sealing in this particular area. This can be achieved by arranging a highly magnetic permeable material like the one discussed above, i.e. Ferrotron™, around the parts of the conductors 44 and 45 that are arranged to be positioned most adjacent to the intersection between the first and second joints during sealing. In FIGS. 7a–c, a Ferrotron™-insert 65 can be seen arranged around the conductors 44 and 45, and embedded in the insulating body 55, of the induction heating means 43. In FIGF. 11a–c, three different embodiments of the Ferrotron™-insert 65 can be seen isolated from the rest of the induction heating means. The function of the Ferrotron™-insert is to concentrate the magnetic field, created by the inducing current in the conductors 44 and 45, to locally increase the power generation in the aluminium foil 16. The result of this operation will be a stronger sealing of the second joint 26 at the intersection with the first joint 23.

Figure 12:
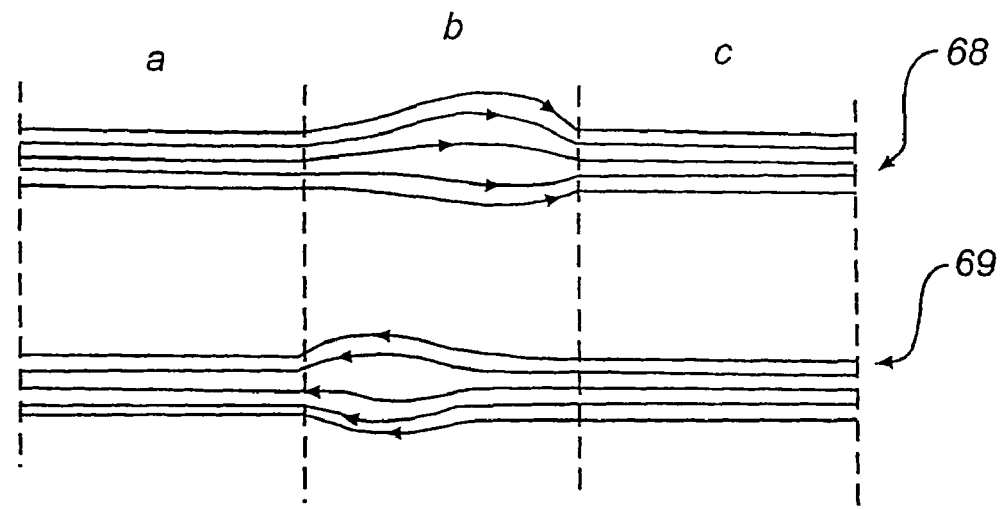
FIG. 12 illustrates spreading of induced current in a critical part of the package in FIG. 2 during sealing.
Figure 13A:
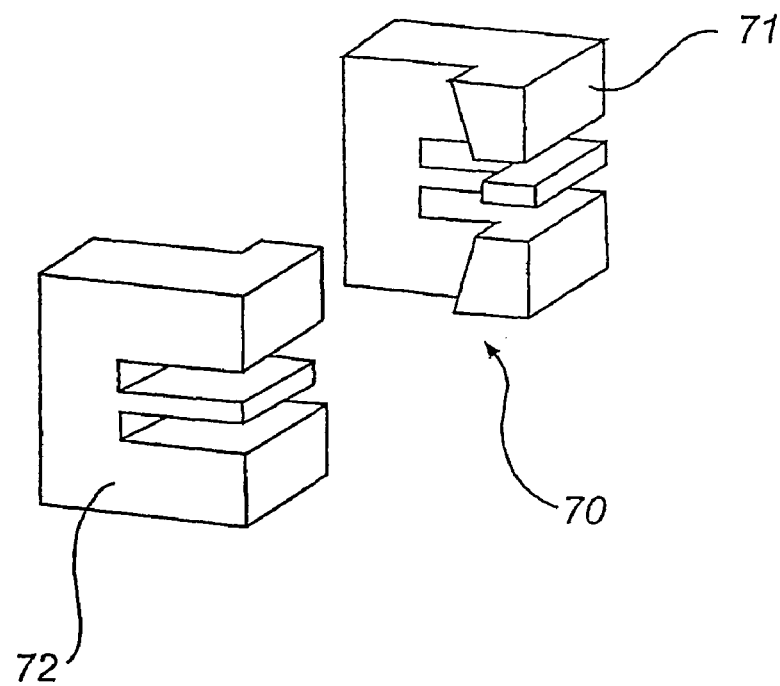
FIG. 13a shows another insert for concentrating magnetic fields, which can be used in connection with the induction heating means according to the present invention.
Figure 13B:
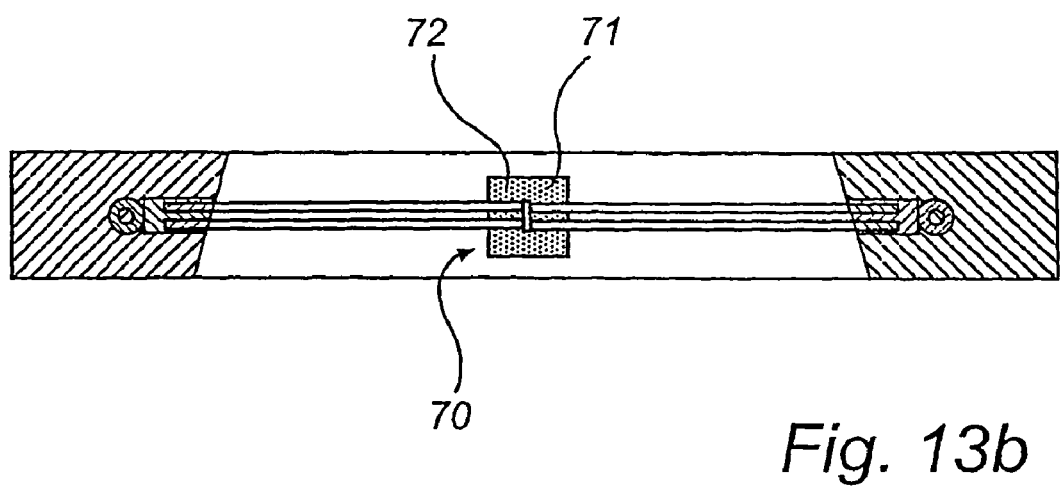
FIG. 13b illustrates the insert in FIG. 13a arranged in the induction heating means according to the present invention.

Another critical part of the package 10 is the part of the second joint that, during sealing, will be arranged most adjacent to the electrical connection element 47, which was described with reference to FIGS. 8b–c. This other critical part of the second joint can be seen enclosed by an encirclement 66 in FIG. 9b. Since the conductors 44 and 45 do not follow the second joint 26 continuously in this area, the induced current will not be "guided" along the part of the second joint corresponding to the distance between the plus and minus pole connectors 48 and 49, indicated by number 67 in FIG. 9b. FIG. 12 schematically illustrates the behaviour of the induced heating current in the aluminium foil 16 in the encirclement 66. The upper part 68 of FIG. 12 illustrates the behaviour of the first heating current moving in direction 62 in FIG. 10. The lower part 69 of FIG. 12 illustrates the behaviour of the second heating current moving in direction 63 in FIG. 10. In sections a and c, the induced heating currents are "guided" by the conductors and, therefore, follow an essentially straight path along the second joint. In section b, corresponding to the distance between the plus and minus pole connectors of the electrical connection element, i.e. the distance 67 in FIG. 9b, the "guidance" is missing, and the induced heating currents starts spreading. This spreading will cause the power generation in section b to be lower than in sections a and c. In turn, this will give rise to a poorer sealing of the part of the second joint corresponding to section b. To overcome this deficiency, the above described technique can be applied to locally increase the power generation in the area concerned, to improve the result of the sealing. For this purpose, the Ferrotron™-insert 70 according to FIG. 13a can be used and arranged around the area between the plus and minus pole connectors. This is illustrated in FIG. 13b, which corresponds to FIG. 7d, where the induction heating means 43 has been provided with the Ferrotron™-insert 70. As is apparent from FIG. 13a, the insert 70 is comprised of two parts, 71 and 72, which are combined in the final assembly according to FIG. 13b.

Above, an induction heating means arranged to be provided on the outside of the package 10 during sealing of the second joint 26 has been described. According to an alternative embodiment the induction heating means according to the present invention can instead be arranged to be provided inside the package during sealing of the second joint. Such an "inside" induction heating means is schematically illustrated in FIGS. 14a–e. FIG. 14a is a top plan view, and FIGS. 14b and c are side views, of an "inside" induction heating means 73 according to the present invention. FIGS. 14d and e are cross-sectional views of the "inside" induction heating means 73, taken along the lines A—A and B—B, respectively, in FIG. 14a. The "inside" induction means, or "inside" inductor means, 73 comprises two conductors 74 and 75, which are similar to the conductors 44 and 45 of the induction heating means 43 in FIG. 7. Also the conductors 74 and 75 are arranged to be connected to a 500 kHz high frequency current supply means like the one denoted 46 in FIG. 8b. For this purpose, the inductor means 73 further comprises an electrical connection element 76, which is similar to the electrical connection element 47 of the inductor means 43.

Further, the inductor means 73 comprises a support element for the conductors 74, 75, in the shape of an insulating body 77 in which the conductors 74 and 75, and the electrical connection element 76, partially are arranged. The body has a frusto conical shape because of its sloping outer wall 78. As is apparent from FIGS. 14a–e, the conductors 74 and 75 are arranged along this outer wall 78, almost entirely embedded within the body. Only the "outer walls" of them can be seen from the outside of the induction heating means 73. Additionally, the induction heating means 73 comprises a cooling element embedded in the insulating body and comprising a copper tubing 79 which guides a cooling medium along the conductors 74 and 75. Further, just like in the aforementioned embodiment, a Ferrotron™-insert 80 is arranged between the conductors 74 and 75 to prevent the magnetic fields around the two conductors from interfering with each other.

Figure 15:
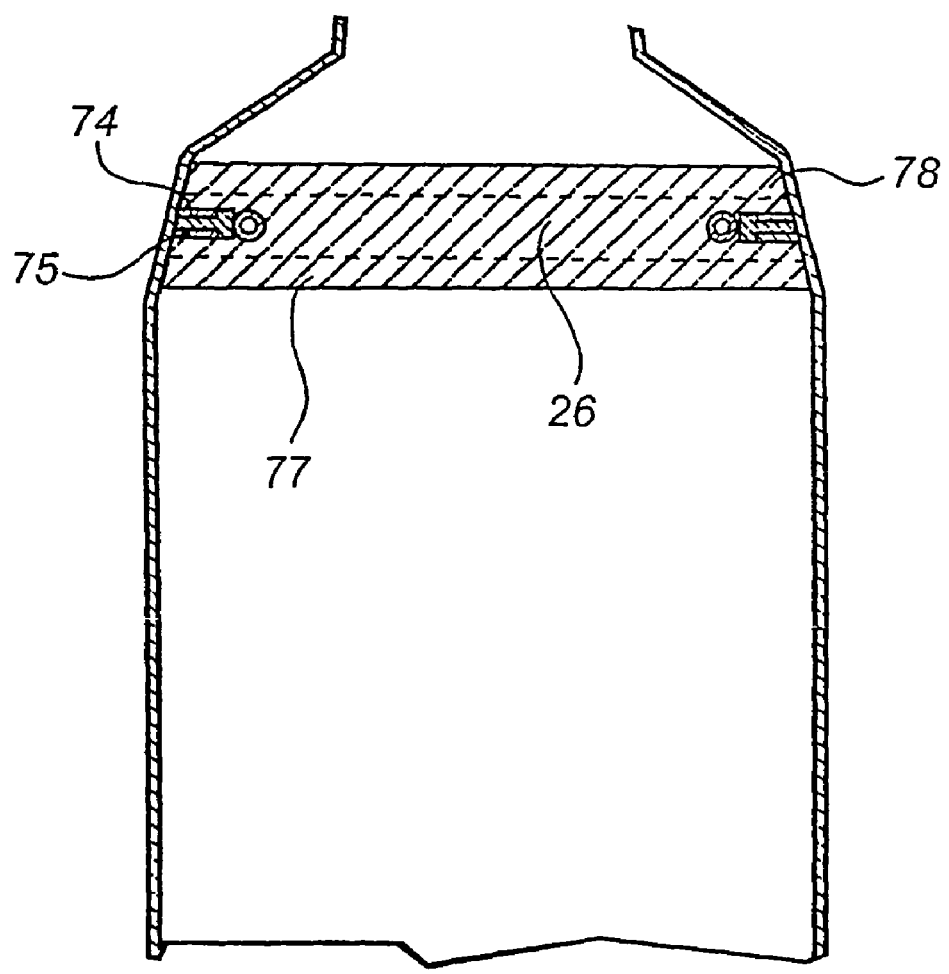
FIG. 15 illustrates an arrangement for sealing a joint of the package in FIG. 2 by means of the induction heating means in FIGS. 14a–e.

FIG. 15 is a cross sectional view of the arrangement for sealing the second joint 26 of the package 10 by means of the induction heating means 73. As is apparent from FIG. 15, the inductor means 73 is arranged on the inside along the second joint 26 during sealing. For achieving this arrangement, the induction heating means 73 is slipped into the sleeve 11. This is equivalent with the sleeve being slipped over the induction heating means. Since the plastic top 12 is tapered in a direction from the second joint 26, the inductor means 73 will move freely in the unsealed package a certain distance before the plastic top "gets caught" by the outer wall 78 of the inductor means. The outer circumference of the conductors 74 and 75 is essentially equal to the inner circumference of the package parts 11 and 12 along the second joint 26. Therefore, the package will "get caught" on the induction means 73 in such a way that the second joint will surround the conductors, i.e. the conductors will follow the inside of the second joint around the package.

Besides the arrangement of the induction heating means in relation to the package during sealing, the two different inductor means discussed, 43 and 73, function in a similar way and provide the same advantages on the sealing. Further, also in the case with the "inside" inductor means 73, Ferrotron™-inserts like the ones illustrated in FIGS. 11a–11c and 13a can be arranged around the connectors 74 and 75 at the joint intersection, and around the area between the plus and minus pole connectors of the electrical connection element 76, respectively, to improve the sealing efficiency in these areas. Though, it should be pointed out, that the device 1 for manufacturing packages illustrated in FIG. 1 may have to be slightly modified if the sealing apparatus 28 instead comprises an "inside" induction heating means. Further, the method for manufacturing the package 10 in FIG. 2 by means of such a modified device will comprise the same steps as the previously discussed method performed by means of the device 1. However, the order between the steps in the flowchart in FIG. 4 may have to be changed.

Figure 16A:
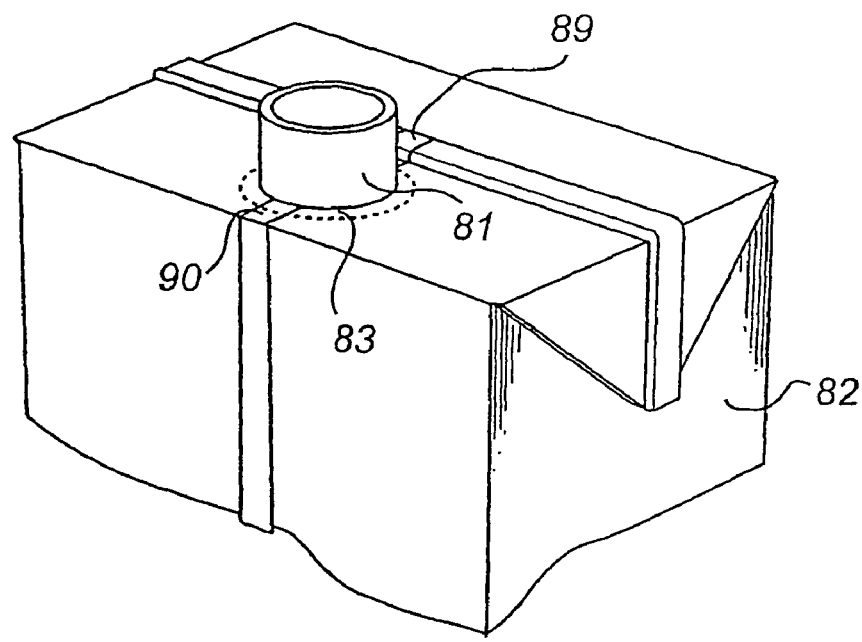
FIGS. 16a–b show a package, which can be manufactured by means of an alternative embodiment of the induction heating means according to the present invention.
Figure 16B:
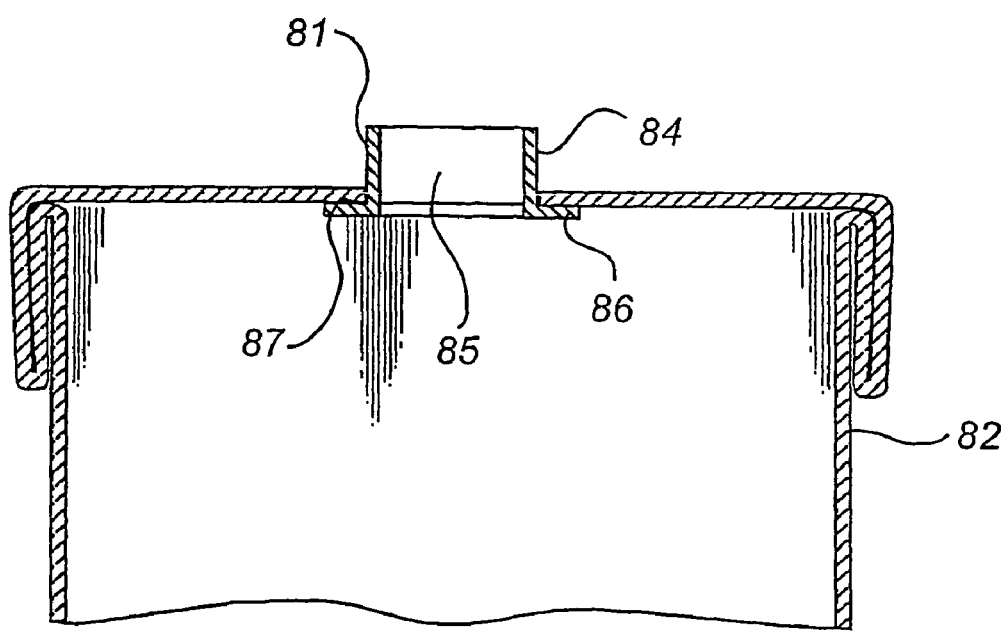

According to an alternative embodiment, the induction heating means according to the present invention can be used for induction heat sealing between a first and a second package part in the form of a container and a closure. The invention is particularly useful in cases where the closure is to be arranged in an area of the container including an already sealed joint. FIG. 16a is a perspective view illustrating an example of such a case, where a closure 81, similar to the closure 31 in FIG. 5b, should be sealed to a container 82, of the type Tetra Brik Aseptic™, along a joint 83. Just like the container 33 in FIG. 5b, the container 82 is composed of a thermoplastic coated material including a metal layer. The metal layer is composed of an aluminium foil. As illustrated in FIG. 16b, which is a cross-sectional view of the package in FIG. 16a, a spout 84 of the closure 81 is arranged to protrude from an opening 85 in the container 82. Further, a flange 86 is arranged to abut against an area 87 around the opening 85 inside the container.

Figure 17A:
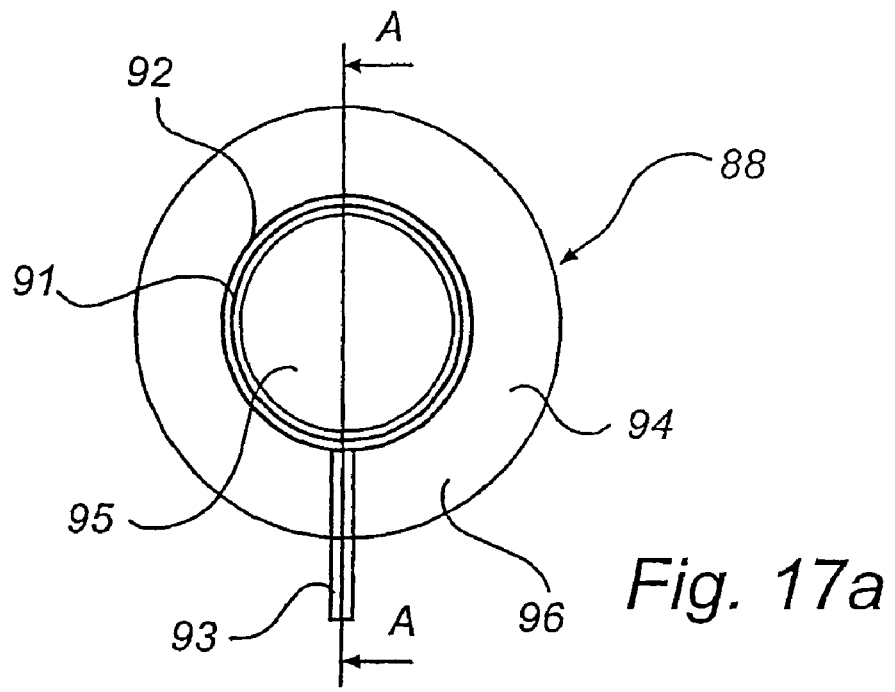
FIGS. 17a–b illustrate an alternative embodiment of the induction heating means for sealing together the package parts in FIGS. 16a–b.
Figure 17B:
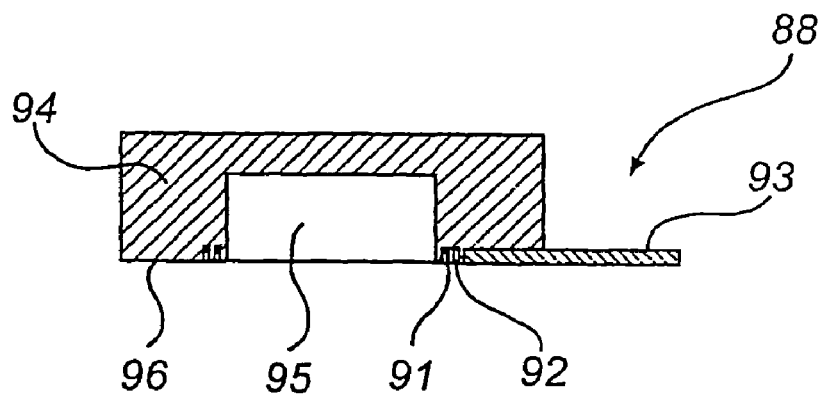
Figure 18:
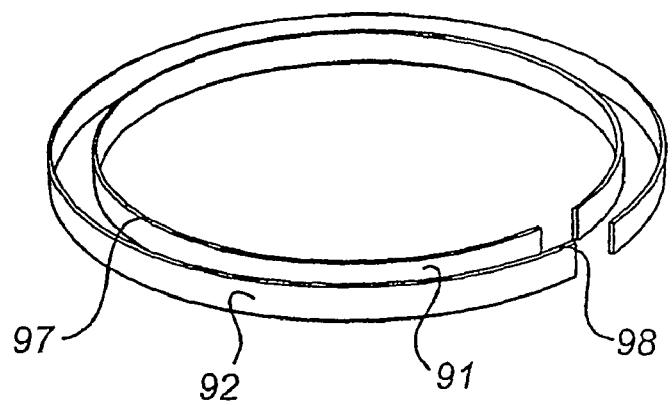
FIG. 18 illustrates isolated parts of the induction heating means in FIGS. 17a–b.

FIG. 17a shows a plan view of an induction heating means 88 according to the present invention for sealing the joint 83 between the container 82 and the closure 81. As is apparent from FIG. 16a, two other already sealed joints, 89 and 90, intersect the joint 83. FIG. 17b is a cross-sectional view of the induction heating means 88, taken along the line A—A in FIG. 17a. The induction heating means 88 comprises two circular copper conductors 91 and 92, which have the same form but different dimensions. The conductors are arranged in the same plane and extend along each other. Further, the conductor 91 is enclosed by the conductor 92. In FIG. 18, the conductors 91 and 92 are shown "naked" and isolated from the rest of the induction heating means 88, below also referred to as the inductor means. Also the conductors 91 and 92 are arranged to be connected to a 500 kHz high frequency current supply means like the one denoted 46 in FIG. 8b. For this purpose, the inductor means 88 further comprises an electrical connection element 93 including a plus pole connector, a minus pole connector and a conductor connector, which connectors (not illustrated) are electrically insulated from each other. The electrical connecting element 93 has the same function as the previously described electrical connection elements, 47 and 76.

Referring again to FIGS. 17a–b, the induction heating means 88 further comprises an insulating body 94 in which the conductors 91 and 92, and the electrical connection element 93, partially are arranged. The body is formed with a cylindrical recess 95. As is apparent from the FIGS. 17a–b, the conductors are arranged, electrically insulated from each other, surrounding the recess along a wall 96, the conductor 91 having an inner circumference that is slightly bigger than the circumference of the recess. The wall 96 is arranged to abut against an area of the container 82 surrounding the spout 84 during the sealing of the joint 83. The conductors are almost entirely embedded within the body 94. Only the surfaces 97 and 98 (FIG. 18) of the conductors 91 and 92, respectively, can be seen from the outside of the induction heating means 88. Additionally, the induction heating means 88 comprises a cooling element like the ones described above (not shown). Just like in the aforementioned embodiments, a Ferrotron™-insert (not shown) is arranged between the conductors 91 and 92 to prevent the magnetic fields around the two conductors from interfering with each other.

Figure 19B:
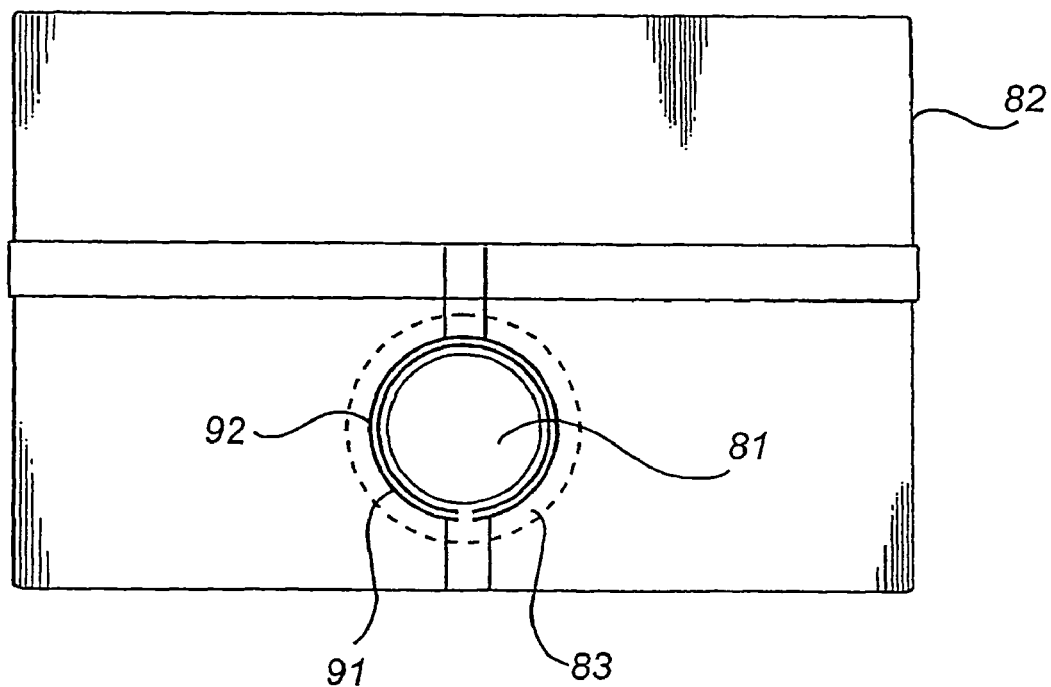

FIG. 19a is a cross-sectional view of the arrangement for sealing the joint 83 between the container 82 and the closure 81 by means of the induction heating means 88. FIG. 19b is a top plan view of the arrangement in FIG. 19a, the induction heating means 88, however, being illustrated without the insulating body 94 and the electrical connection element 93. As is apparent from FIGS. 19a and 19b, the recess 95 is arranged to receive the spout 84 of the closure. Therefore, the circumference of the recess is slightly bigger than the outer circumference of the spout.

FIG. 20 illustrates the result of sealing in accordance with the above arrangement. For the sake of clarity, only a top portion of the carton 82, with the joints 89 and 90 "unsealed", is shown, whereby the top portion is split in two top sections 99 and 100. In this way, the path of the induced heating current in the two top sections can be illustrated clearly. The aluminium foil does not form a continuous conducting area along the complete joint 83 because of the joints 89 and 90. When an inducing current is supplied in the inductor means 88, a first heating current will be induced by the conductor 91 in the aluminium foil, in each of the top sections 99 and 100. These first heating currents will be "guided" by the conductor 91 along the joint in a direction indicated by arrows 101. In a similar way, a second heating current will be induced by the conductor 92 in the aluminium foil, in each of the top sections. These second heating currents will be "guided" by the conductor 92 along the joint in a direction indicated by arrows 102. Thus, the first and second induced heating currents will follow the joint 83 in two parallel opposite directions, 101 and 102. When one of the induced heating currents, "guided" in one of the directions, reaches one of the breaks in the aluminium foil, it will "turn back" and instead be "guided" in the other direction. Most of the induced current will remain in the desired sealing area, which results in a good sealing result.

Naturally, also in the case with the inductor means 88, Ferrotron™-inserts can be arranged around the connectors 91 and 92 at the joint intersections, and around the area between the plus and minus pole connectors of the electrical connection element 93, respectively, to improve the sealing efficiency in these areas.

Above, an induction heating means arranged to be provided on the outside of the container 82 during sealing of the joint 83 has been described. Of course, the induction heating means could also be arranged to be provided inside the container during the sealing of such a joint.

It should be pointed out that the figures are not all drawn according to scale.

The above described embodiments shall only be seen as examples. A person skilled in the art realizes that the embodiments discussed can be combined and varied in a number of ways without deviating from the inventive conception.

As an example, the joint to be sealed may be of other forms than circular, such as elliptic or polygonal. This would require a modified configuration of the induction heating means to be used for the sealing.

Further, the package parts that are to be sealed together need not be of the types described above, but can have other appearances and be composed of other materials.

Additionally, an induction heating means according to the present invention need not be positioned in the correct position, in relation to the joint to be sealed, in the above described ways, i.e. by means of frusto conical holes and recesses with fixed dimensions. The induction heating means may instead be provided with an element for varying its dimensions to position it in a correct position along the joint. Such an induction heating means may also be made adjustable for sealing of different types of joints.

Additionally, an induction heating means according to the present invention may comprise more than two conductors as long as the inducing current is conducted in two opposite directions along the joint to be sealed. Further, the conductors need not be of copper, but can be of another material with low resistivity.

Naturally, the layer of induction heatable material in the sheet need not be of aluminium, but can be of another conductive material.

Finally, the values of the above mentioned quantities, such as frequency and time, are just exemplary, and therefore should not be seen as to limit the scope of the invention.

The invention claimed is:

1. A method for manufacturing packages, comprising providing a tubular first package part of a sheet of thermoplastic coated packaging material including at least one layer of an induction heatable material, the first package part having a sealed first joint between two mutually opposing edge sections of the sheet, joining together the first package part and a second package part, a second joint being formed between the first and the second package part, the first and the second joint intersecting each other, arranging induction heating means including at least two conductors extending along each other, so that the conductors extend along the second joint, and sealing the second joint by feeding an inducing current through the induction heating means such that the inducing current is conducted along the second joint by the at least two conductors and is guided by the at least two conductors such that one of the at least two conductors guides the inducing current in one specific direction and the other of the at least two conductors guides the inducing current in another specific opposite direction, and a sealed subjoint of the second joint is achieved by each one of said at least two conductors.

2. A method according to claim 1, wherein arranging the induction heating means comprises providing the conductors on the outside of the first package part.

3. A method according to claim 1, wherein arranging the induction heating means comprises providing the conductors on the inside of the first package part.

4. A method according to claim 1, further comprising applying a compressive load on the second joint during the sealing of the same.

5. A method according to claim 1, wherein sealing the second joint comprises inducing a heating current in said layer of the induction heatable material, said layer comprising a metal foil.

6. A method according to claim 1, wherein the first joint of the first package part is formed between said two edge sections being overlapping.

7. A method according to claim 1, wherein joining together the first and the second package part comprises positioning the first and second package parts so that the second package part protrudes from an open end of the tubular first package part, and wherein arranging the induction heating means comprises providing the conductors circumferentially along the first package part.

8. A method according to claim 1, wherein joining together the first and the second package part comprises positioning the first and second package parts so that the second package part protrudes from an opening in a wall portion of the first package part, and wherein arranging the induction heating means comprises providing the conductors circumferentially around the opening.

9. A method according to claim 7, wherein joining together the first and the second package part comprises slipping the first package part over the second package part.

10. A device for manufacturing packages, comprising induction heating means including at least two annular conductors extending along each other and being arranged to be connected to a current supply means, wherein the device for manufacturing packages operates to position the induction heating means to arrange the at least two conductors along a joint so that when the at least two conductors are connected to the current supply means which supplies inducing current, a first one of the at least two conductors conducts the inducing current in one specific direction between opposite ends of the first conductor to achieve a sealed subjoint of the joint and a second one of the at least two conductors conducts the inducing current in another specific opposite direction between opposite ends of the second conductor to achieve another sealed subjoint of the joint.

11. A device according to claim 10, wherein the the joint is a second joint formed between a tubular first package part of a sheet of thermoplastic coated packaging material including at least one layer of an induction heatable material, the first package part having a sealed first joint between two mutually opposing edge sections of the sheet, and a second package part, the first and the second joint intersecting each other.

12. A device for manufacturing packages, comprising
means for providing a tubular first package part of a sheet of thermoplastic coated packaging material including at least one layer of an induction heatable material, the first package part having a sealed first joint between two mutually opposing edge sections of the sheet,
means for joining together the first package part and a second package part, a second joint being formed between the first and the second package part, the first and the second joint intersecting each other,
current supply means for feeding an inducing current,
induction heating means for sealing the second joint, the induction heating means being connected to the current supply means and including at least two conductors extending along each other,
the at least two conductors being constructed and connected to the current supply means such that one of the at least two conductors conducts the inducing current along the second joint in one specific direction and the other one of the at least two conductors conducts the inducing current along the second joint in another specific opposite direction, and the device positioning the induction heating means during operation to arrange the at least two conductors along the second joint so that each one of the at least two conductors produces a sealed subjoint of the second joint.

13. A device according to claim 12, wherein the conductors are arranged to be provided on the outside of the first package part.

14. A device according to claim 13, wherein the induction heating means is formed with a hole or recess for receiving portions of the first and second package parts forming the second joint, the conductors being arranged along a wall enclosing the hole or recess.

15. A device according to claim 14, wherein a circumference of the hole or recess is essentially equal to an outer circumference of the package parts along the second joint, the wall enclosing the hole or recess exerting a compressive load on the second joint during the sealing of the same.

16. A device according to claim 14, wherein the hole or recess is frusto conical for receiving said second package part being tapered in a direction from the second joint, a smallest circumference of the hole or recess being smaller than an outer circumference of the package parts along the second joint, the wall enclosing the hole or recess exerting a compressive load on the second joint during the sealing of the same.

17. A device according to claim 13, wherein an inner circumference of each of the conductors is essentially equal to an outer circumference of the package parts along the second joint.

18. A device according to claim 13, wherein the induction heating means is formed with a recess or hole for receiving at least a portion of the second package part, the conductors being arranged in one and the same plane, one of them enclosing another, and surrounding the recess or hole.

19. A device according to claim 12, wherein the conductors are arranged to be provided on the inside of the first package part.

20. A device according to claim 19, wherein the induction heating means includes a support element arranged to be surrounded by portions of the first and second package parts forming the second joint, the conductors being arranged along a wall on, and enclosing, the support element, the wall exerting a compressive load on the second joint during the sealing of the same.

21. A device according to claim 19, wherein an outer circumference of each of the conductors is essentially equal to an inner circumference of the package parts along the second joint.

22. A device according to claim 12, wherein the conductors have essentially uniform cross-sections.

23. A device according to claim 12, wherein the conductors have essentially the same dimensions.

24. A device according to claim 12, wherein each of the conductors forms a circumferential and incomplete current path along the second joint.

25. A device according to claim 12, wherein the conductors are connected to each other at a first end and to the current supply means at a second end.

26. A device according to claim 25, wherein each of the conductors has such a shape that the first end is arranged in the vicinity of the second end.

27. A device according to claim 12, wherein the induction heating means is arranged to induce a heating current in said layer of the induction heatable material, said layer comprising a metal foil.

28. A device according to claim 12, wherein the first joint of the first package part is formed between said two edge sections being overlapping.

29. A device according to claim 12, wherein the means for joining together the first and the second package part is arranged to position the first and second package parts so that the second package part protrudes from an open end of the tubular first package part, and wherein the conductors are arranged to be provided circumferentially along the first package part.

30. A device according to claim 12, wherein the means for joining together the first and the second package part is arranged to position the first and second package parts so that the second package part protrudes from an opening in a wall portion of the first package part, and wherein the conductors are arranged to be provided circumferentially around the opening.

31. A device according to claim 29, wherein the means for joining the first and the second package part is arranged to slip the first package part over the second package part.

* * * * *